US008307170B2

(12) United States Patent
Fujino

(10) Patent No.: US 8,307,170 B2
(45) Date of Patent: Nov. 6, 2012

(54) INFORMATION PROCESSING METHOD AND SYSTEM

(75) Inventor: Shuji Fujino, Ayase (JP)

(73) Assignee: Hitachi, Ltd., Tokyo (JP)

( * ) Notice: Subject to any disclaimer, the term of this patent is extended or adjusted under 35 U.S.C. 154(b) by 679 days.

(21) Appl. No.: 11/172,910

(22) Filed: Jul. 5, 2005

(65) Prior Publication Data
US 2006/0265558 A1 Nov. 23, 2006

(30) Foreign Application Priority Data

May 17, 2005 (JP) .................................. 2005-144634

(51) Int. Cl.
*G06F 12/02* (2006.01)
(52) U.S. Cl. ....................................... 711/153; 711/119
(58) Field of Classification Search .................. 711/119, 711/153
See application file for complete search history.

(56) References Cited

U.S. PATENT DOCUMENTS

| | | | | | |
|---|---|---|---|---|---|
| 4,463,424 | A | * | 7/1984 | Mattson et al. | 711/136 |
| 4,503,501 | A | * | 3/1985 | Coulson et al. | 711/129 |
| 5,394,531 | A | * | 2/1995 | Smith | 711/136 |
| 5,434,992 | A | * | 7/1995 | Mattson | 711/119 |
| 5,752,255 | A | * | 5/1998 | Jarvis | 711/3 |
| 6,092,180 | A | * | 7/2000 | Anderson et al. | 712/200 |
| 6,260,114 | B1 | * | 7/2001 | Schug | 711/129 |
| 6,446,028 | B1 | * | 9/2002 | Wang | 702/186 |
| 6,601,151 | B1 | * | 7/2003 | Harris | 711/158 |
| 6,697,849 | B1 | * | 2/2004 | Carlson | 709/219 |
| 6,845,503 | B1 | * | 1/2005 | Carlson et al. | 717/166 |
| 6,996,820 | B1 | * | 2/2006 | Middleton et al. | 718/100 |
| 7,043,606 | B2 | * | 5/2006 | Roskind | 711/118 |
| 7,337,285 | B2 | * | 2/2008 | Tanoue | 711/158 |
| 7,487,320 | B2 | * | 2/2009 | Bansal et al. | 711/170 |
| 2005/0039183 | A1 | * | 2/2005 | Romero et al. | 718/100 |
| 2006/0129782 | A1 | * | 6/2006 | Bansal et al. | 711/170 |

FOREIGN PATENT DOCUMENTS

JP 2002-358259 12/2002
JP 2005-025294 1/2005

OTHER PUBLICATIONS

Ferrari et a. An Approach to Adaptive Performance Tuning of Application Servers. Oct. 17, 2004. Workshop on Quality of Service for Application Servers. 23rd Symposium on Reliable Distributed Systems. IEEE Computer Society. pp. 7-12.*
Suh, G. E. et al. Dynamic Partitioning of Shared Cache Memory. Apr. 1, 2004. The Journal of Supercomputing. vol. 28 No. 2004.*

* cited by examiner

*Primary Examiner* — Yaima Campos
*Assistant Examiner* — Samuel Dillon
(74) *Attorney, Agent, or Firm* — Antonelli, Terry, Stout & Kraus, LLP.

(57) ABSTRACT

At least one processor for executing a plurality of programs, a storage area which is capable of storing an information element temporarily, and a storage device which is capable of storing the information element, are provided. A certain level of importance is associated with each of the programs themselves or a performance requirement of each program. When a certain information element is output as a result of execution of a certain program from among the plurality of programs, the certain information element is written into the storage area. Then, a plurality of information elements written in the storage area is output to the storage device side in order of precedence from the information element of the executed program, or the performance requirement thereof, having the highest level of importance.

6 Claims, 25 Drawing Sheets

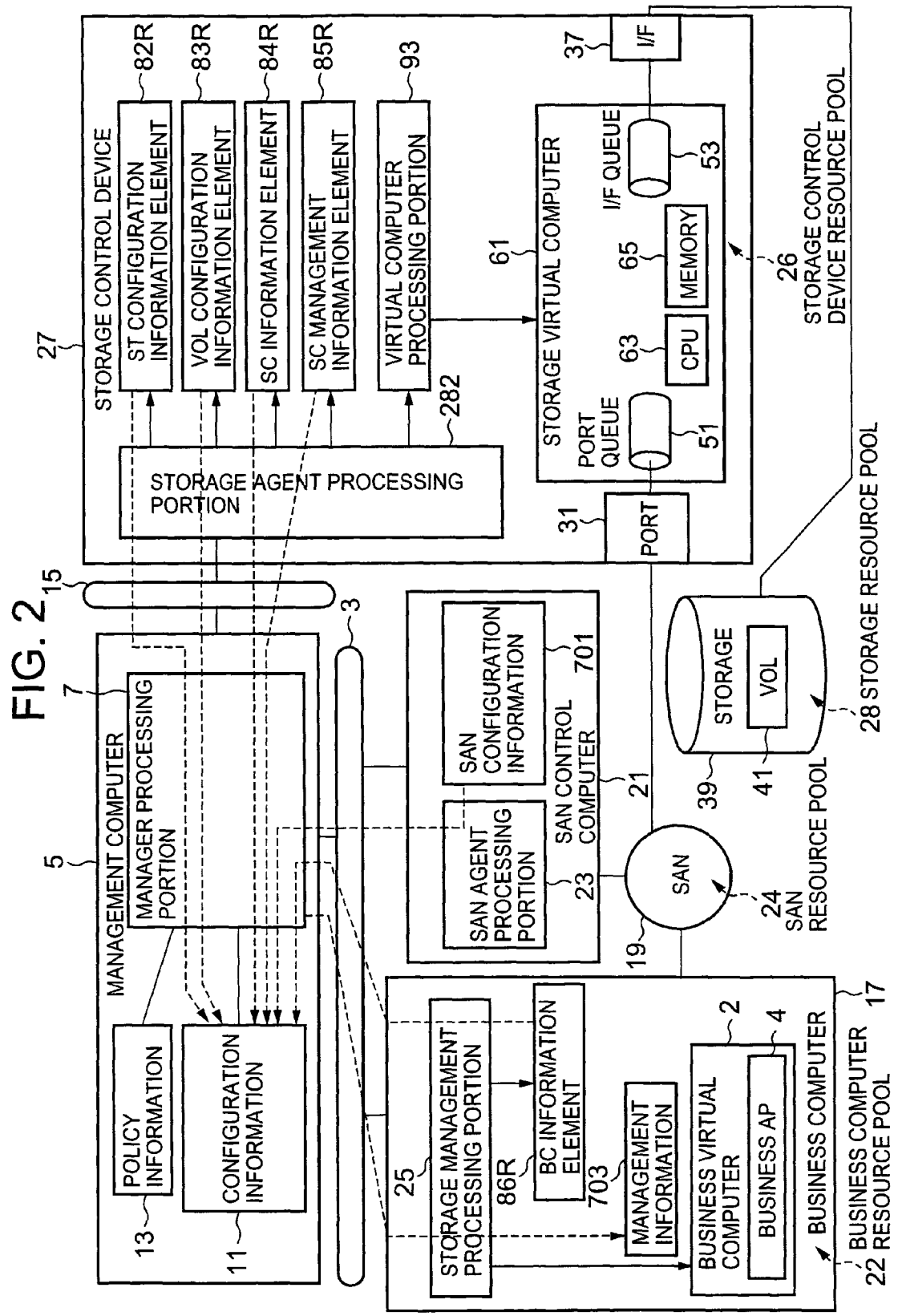

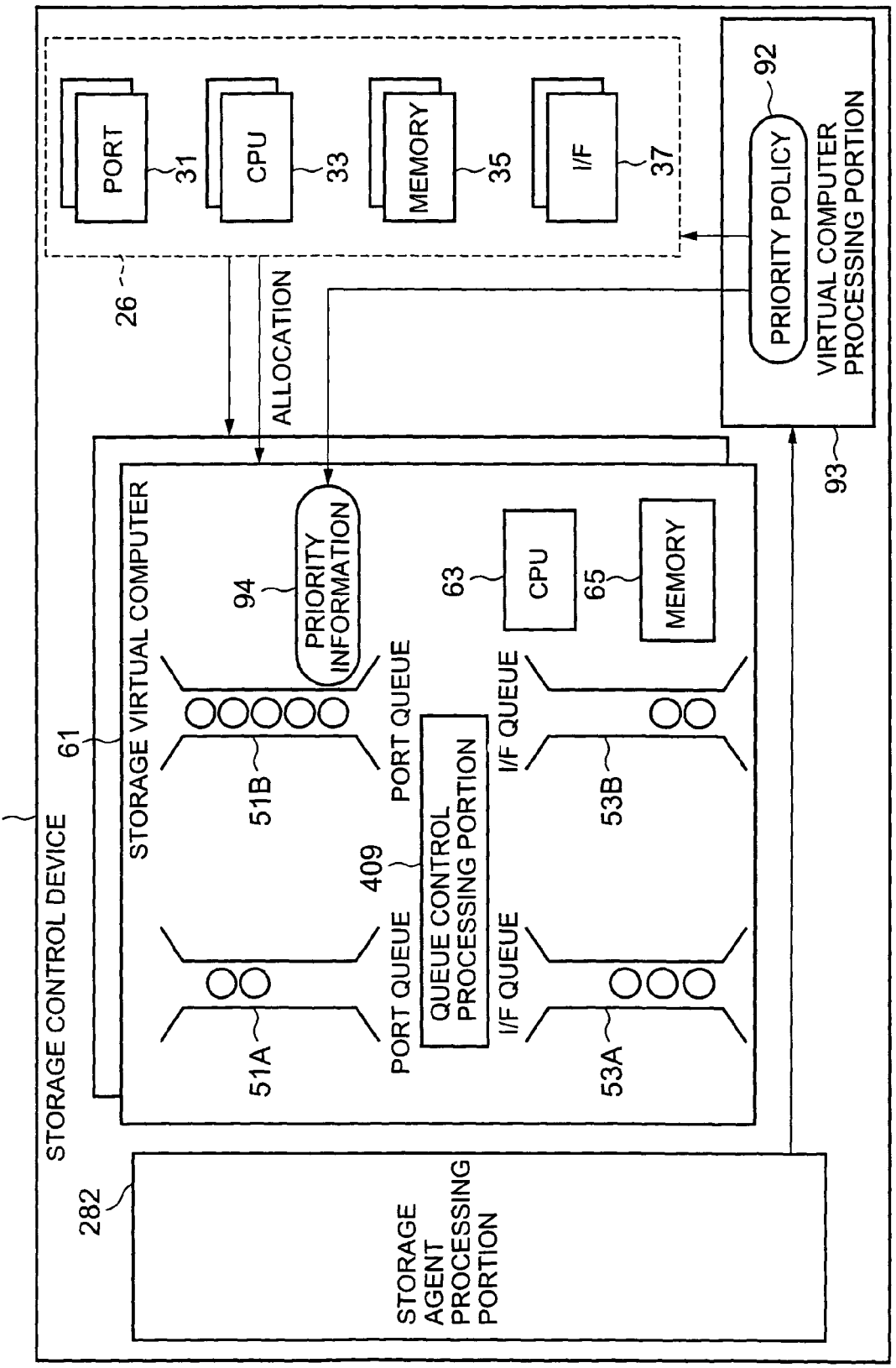

FIG. 5A

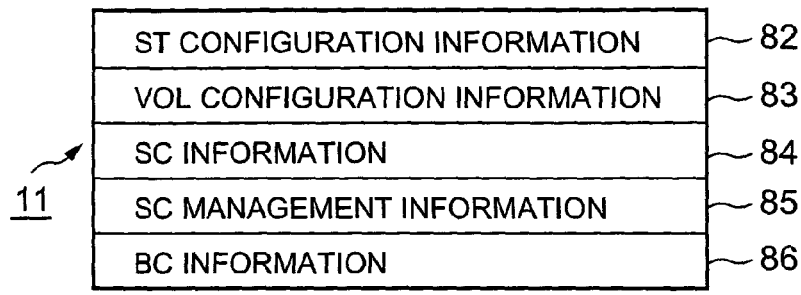

| | |
|---|---|
| ST CONFIGURATION INFORMATION | 82 |
| VOL CONFIGURATION INFORMATION | 83 |
| SC INFORMATION | 84 |
| SC MANAGEMENT INFORMATION | 85 |
| BC INFORMATION | 86 |

| NO. | ST NAME | STORAGE CAPACITY | USED STORAGE CAPACITY | PERFORMANCE |
|---|---|---|---|---|
| 1 | ST39A | 5TB | 3TB | HIGH SPEED |
| 2 | ST39B | 20TB | 10TB | MEDIUM SPEED |
| 3 | ST39C | 80TB | 50TB | LOW SPEED |
| ⋮ | ⋮ | ⋮ | ⋮ | ⋮ |

| NO. | ST NAME | VOL NAME | VOL CAPACITY | USED VOL CAPACITY |
|---|---|---|---|---|
| 1 | ST39A | VOL41A | 2TB | 1TB |
| 2 | ST39A | VOL41B | 1TB | 0.8TB |
| 3 | ST39B | VOL41C | 5TB | 3TB |
| 4 | ST39B | VOL41D | 3TB | 2TB |
| 5 | ST39B | VOL41E | 2TB | 1TB |
| 6 | ST39C | VOL41F | 5TB | 4TB |
| ⋮ | ⋮ | ⋮ | ⋮ | ⋮ |

| NO. | SC NAME | NUMBER OF CONNECTED STORAGES | STORAGE CONTROL INFORMATION | CONNECTED STORAGE INFORMATION |
|---|---|---|---|---|
| 1 | SC27A | 3 | | |
| 2 | SC27B | 2 | | |
| ... | ... | ... | | |

84

| NO. | ST NAME |
|---|---|
| 1 | ST39A |
| 2 | ST39B |
| 3 | ST39C |

| NO. | ST NAME |
|---|---|
| 1 | ST39D |
| 2 | ST39E |

84R

Storage Control Information:
- NUMBER OF LOADED PORTS (=n)
- LOADED PORT INFORMATION
- NUMBER OF LOADED I/Fs (=m)
- LOADED I/F INFORMATION
- NUMBER OF SVCs (=p)
- SVC INFORMATION
- NUMBER OF LOADED CPUs (=e)
- LOADED MEMORY CAPACITY (=f)

FIG. 6B

| NO. | SVC NAME | PRESENCE OF DETAILED INFORMATION |
|---|---|---|
| 1 | SVC61A | PRESENT |
| 2 | SVC61B | PRESENT |
| ... | ... | ... |
| p | SVC61p | ABSENT |

| NO. | DETAILED INFORMATION |
|---|---|
| 1 | NUMBER OF USED PORTS (=2) |
| 2 | USED PORT INFORMATION |
| 3 | NUMBER OF USED I/Fs (=2) |
| 4 | USED I/F/ INFORMATION |
| 5 | NUMBER OF USED CPUs (=3) |
| 6 | USED CPU INFORMATION |
| 7 | USED MEMORY CAPACITY (=y) |
| 8 | NUMBER OF PORT QUEUES (=2) |
| 9 | PORT QUEUE INFORMATION |
| 10 | NUMBER OF I/F QUEUES (=2) |
| 11 | I/F QUEUE INFORMATION |

USED PORT INFORMATION

| NO. | PORT NAME |
|---|---|
| 1 | PORT 31A |
| 2 | PORT 31B |

USED I/F INFORMATION

| NO. | I/F NAME |
|---|---|
| 1 | I/F37A |
| 2 | I/F37B |

USED CPU INFORMATION

| NO. | CPU NAME | CPU USAGE PROPORTION |
|---|---|---|
| 1 | CPU33A | 100% |
| 2 | CPU33B | 50% |
| 3 | CPU33C | 80% |

FIG. 7B

| NO. | VOL NAME | SVC NAME | PORT NAME | I/F NAME |
|---|---|---|---|---|
| 1 | VOL41A | SVC61A | PORT 31A | I/F37A |
| 2 | VOL41A | SVC61A | PORT 31B | I/F37B |
| 3 | VOL41B | SVC61B | PORT 31C | I/F37C |
| ⋮ | ⋮ | ⋮ | ⋮ | ⋮ |

| NO. | BVC NAME |
|---|---|
| 1 | BVC2A |

| NO. | AP NAME | PERFORMANCE REQUIREMENT | BUSINESS ID |
|---|---|---|---|
| ... | ... | ... | ... |

| NO. | AP NAME | PERFORMANCE REQUIREMENT | BUSINESS ID |
|---|---|---|---|
| 1 | AP4A | HIGH | AP1 |
| 2 | AP4B | MEDIUM | AP2 |
| 3 | AP4C | LOW | AP3 |
| 4 | AP4D | HIGH | AP4 |

| NO. | BC NAME | PORT NAME |
|---|---|---|
| 1 | BC17A | 600A |
| 2 | BC17B | 600B |
| .. | .. | .. |
| r | BC17r | |

| NO. | SC NAME | ACCESS DESTINATION PORT NAME | ACCESS SOURCE PORT NAME | VOL NAME |
|---|---|---|---|---|
| ... | ... | ... | ... | ... |

703

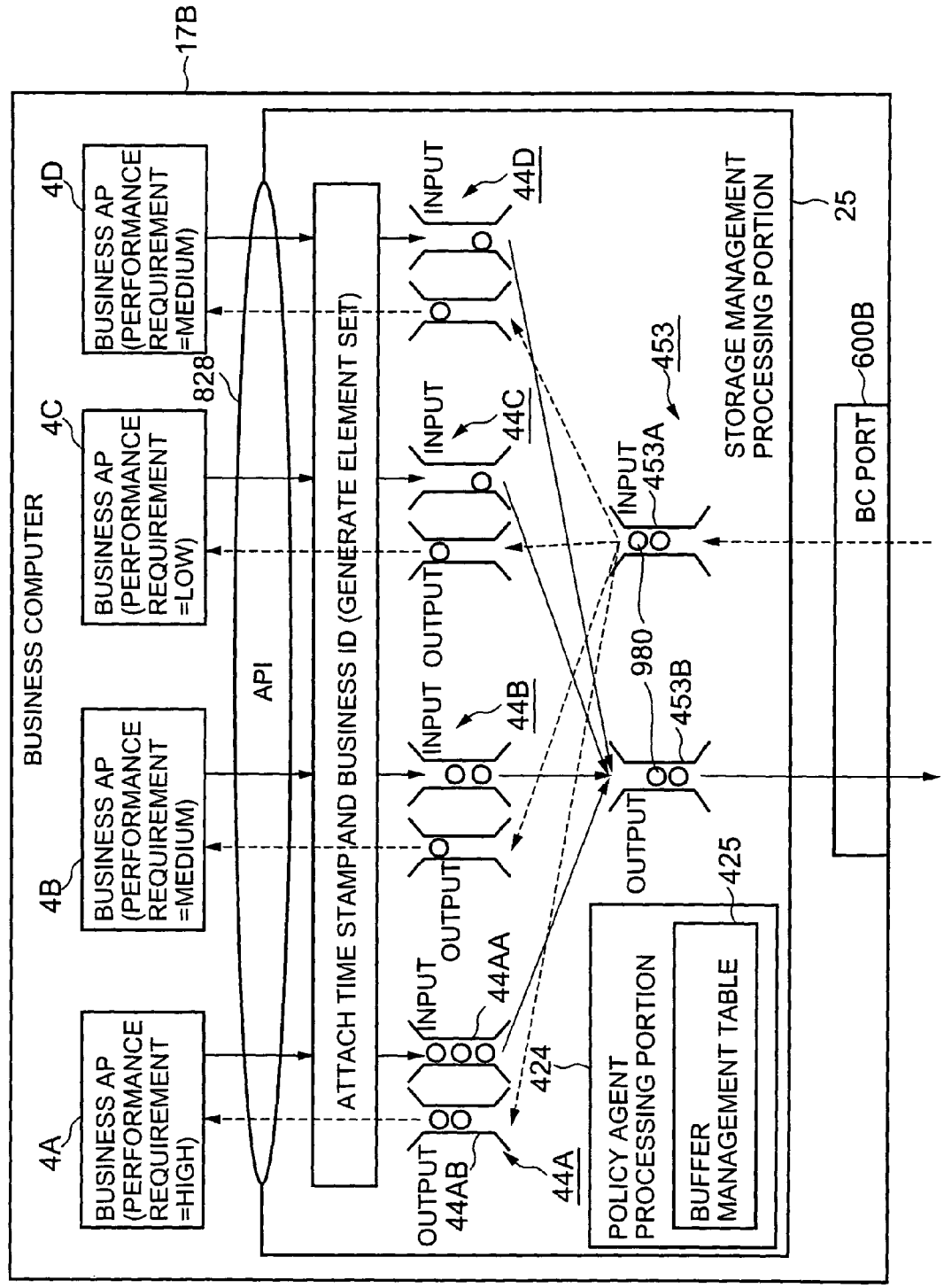

| NO. | BUSINESS ID | BUFFER SET NAME | WEIGHTING RATIO [%] |
|---|---|---|---|
| 1 | AP1 | BUFFER A | 40 |
| 2 | AP2 | BUFFER B | 25 |
| 3 | AP3 | BUFFER C | 10 |
| 4 | AP4 | BUFFER D | 25 |

| NO. | PERFORMANCE REQUIREMENT | BUSINESS ID | DETACHED DATA |
|---|---|---|---|
| 1 | HIGH | AP1 | ・・・・・・・・・・ |
| 2 | MEDIUM | AP2 | ・・・・・・・・・・ |
| 3 | LOW | AP3 | |
| ⋮ | ⋮ | ⋮ | ⋮ |
| n | HIGH | APn | ・・・・・・・・・・ |

| NO. | BUSINESS ID | BUFFER SET NAME | WEIGHTING RATIO [%] |
|---|---|---|---|
| 1 | AP1 | BUFFER A | 30 |
| 2 | AP2 | BUFFER B | 10 |
| ⋮ | ⋮ | ⋮ | ⋮ |
| N | APN | BUFFER N | 30 |

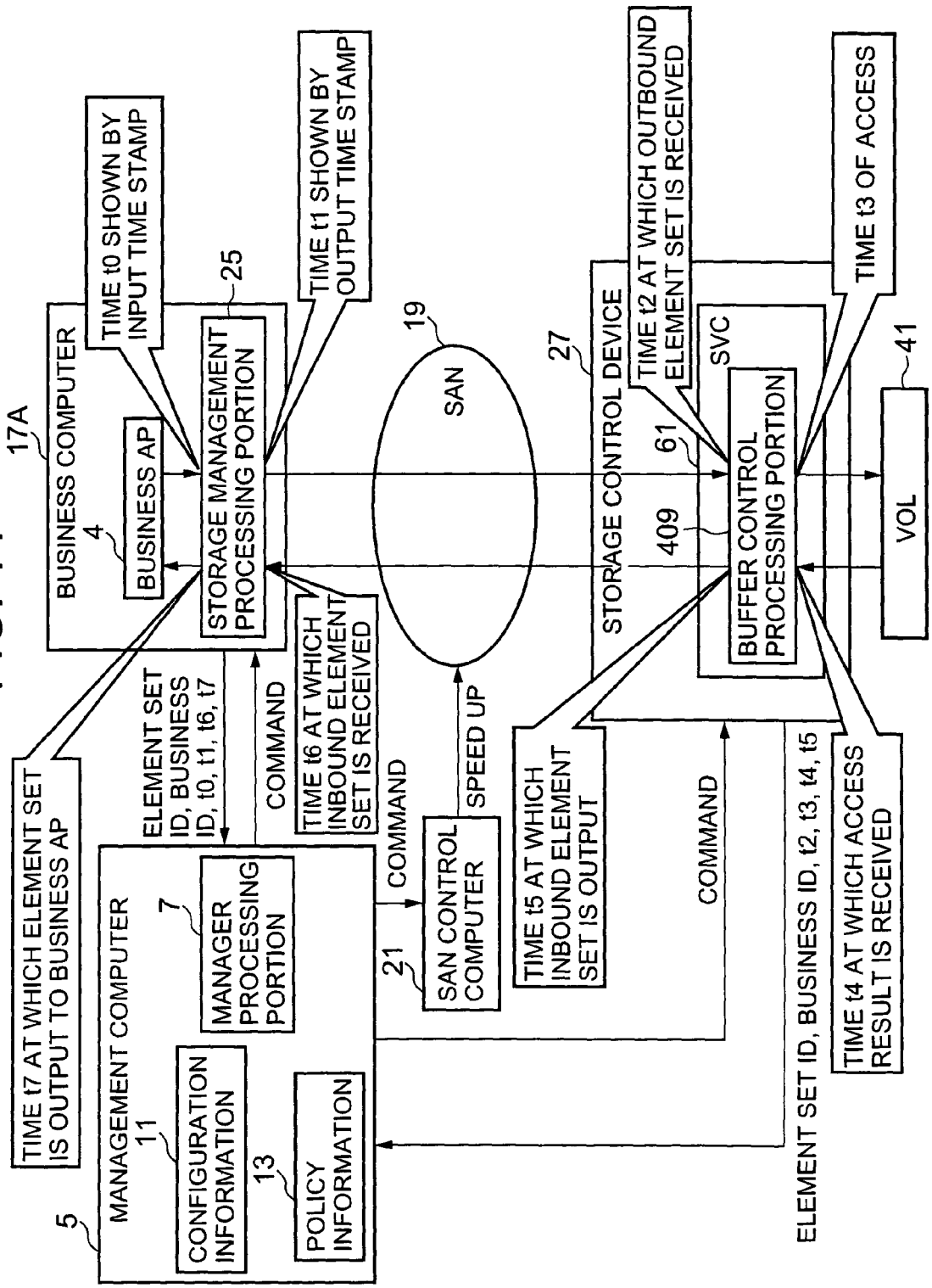

FIG. 15A

| ELEMENT SET ID = · ·<br>BUSINESS ID = · · | MEASURED VALUE |
|---|---|
| (1) RESPONSE TIME LENGTH<br>(t7-t0) | _____ |
| (2) FIRST OUTBOUND PROCESSING<br>TIME LENGTH (t1-t0) | _____ |
| (3) OUTBOUND COMMUNICATION<br>TIME LENGTH (t2-t1) | _____ |
| (4) SECOND OUTBOUND PROCESSING<br>TIME LENGTH (t3-t2) | _____ |
| (5) IO PROCESSING TIME LENGTH<br>(t4-t3) | _____ |
| (6) FIRST INBOUND PROCESSING<br>TIME LENGTH (t5-t4) | _____ |
| (7) INBOUND COMMUNICATION<br>TIME LENGTH (t6-t5) | _____ |
| (8) SECOND INBOUND PROCESSING<br>TIME LENGTH (t7-t6) | _____ |
| (9) OUTBOUND TIME LENGTH<br>(t3-t0) | _____ |
| (10) INBOUND TIME LENGTH (t7-t4) | _____ |

<BUSINESS ID=AP2>

<BUSINESS ID=AP1>

(A) WHEN MEASURED VALUE OF OUTBOUND TIME LENGTH > THRESHOLD A1 AND/OR MEASURED VALUE OF OUTBOUND TIME LENGTH - MEASURED VALUE OF INBOUND TIME LENGTH > CONSTANT S, PERFORM ONE OF FOLLOWING (A-1) TO (A-4).

(A-1) DECREASE RESOURCES AND READING SPEED OF BUFFER INPUT BUFFER (AND/OR FIRST INPUT BUFFER) CORRESPONDING TO BUSINESS ID=AP3 BY 10% EACH, AND INCREASE RESOURCES AND READING SPEED OF PORT INPUT BUFFER (AND/OR FIRST INPUT BUFFER) CORRESPONDING TO BUSINESS ID=AP1 BY 10% EACH (A-2) INCREASE SAN COMMUNICATION SPEED (A-3) REDUCE WEIGHTING RATIO OF FIRST INPUT BUFFER (AND/OR PORT INPUT BUFFER) CORRESPONDING TO BUSINESS ID=AP3 BY 10%, AND INCREASE WEIGHTING RATIO OF FIRST INPUT BUFFER (AND/OR PORT INPUT BUFFER) CORRESPONDING TO BUSINESS ID=AP1 BY 10%

(A-4) INCREASE STORAGE CAPACITY OF CACHE SUB-AREA (B) ------

FIG. 18B

| NO. | PERFORMANCE REQUIREMENT | BUFFER SET NAME | WEIGHTING RATIO |
|---|---|---|---|
| 1 | HIGH SPEED | BUFFER A | 50 |
| 2 | MEDIUM SPEED | BUFFER B | 35 |
| 3 | LOW SPEED | BUFFER C | 15 |

1425

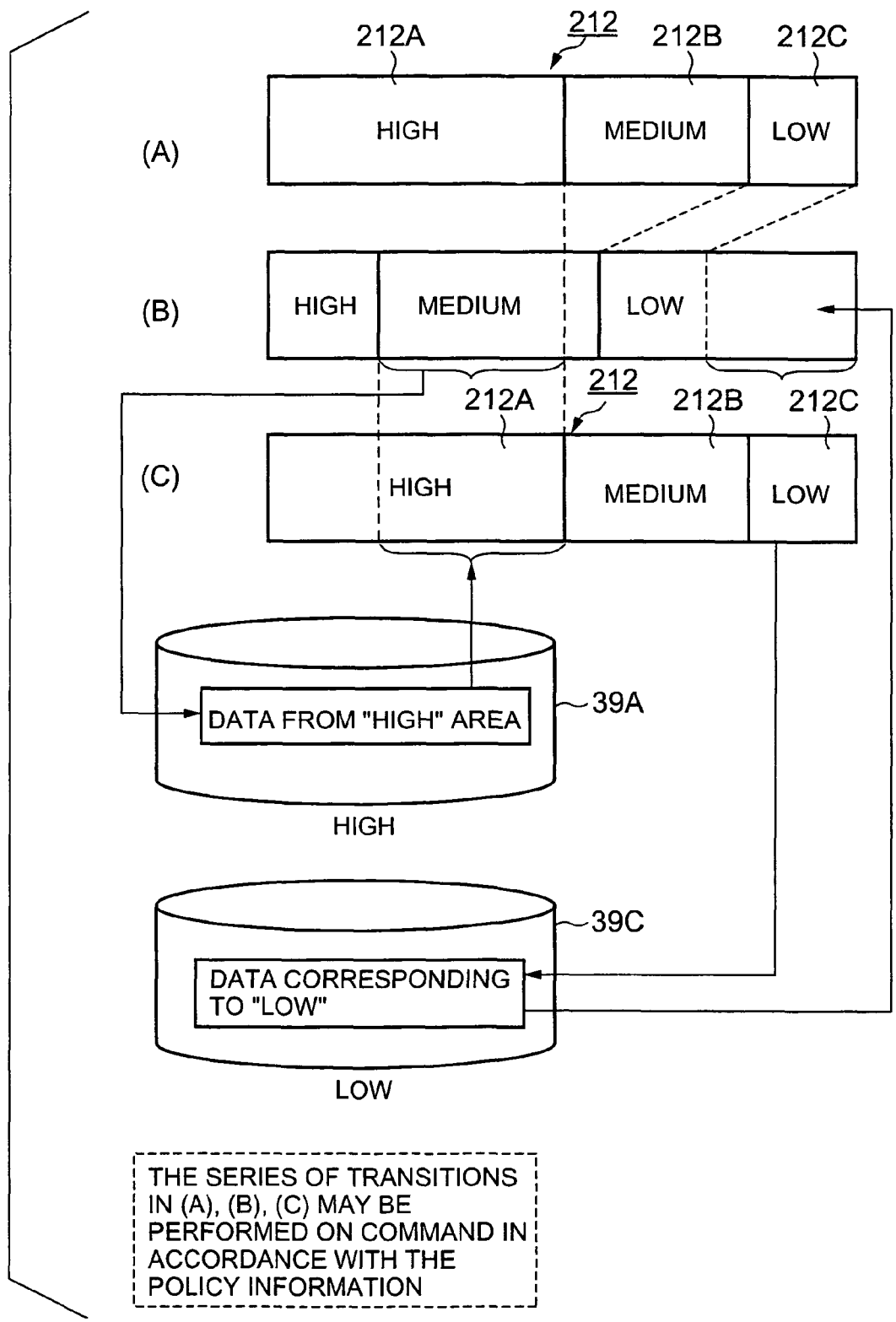

INFORMATION PROCESSING METHOD AND SYSTEM

BACKGROUND OF THE INVENTION

The present invention relates to the processing of electronic information.

Japanese Unexamined Patent Application Publication 2005-055963, for example, discloses a storage device which can store large amounts of electronic information such as data or programs.

Further, Japanese Unexamined Patent Application Publication 2005-10956 discloses a technique for obtaining the load of a plurality of logical paths set between storage devices, and determining the logical path to which a data input/output request is allocated according to the load.

Incidentally, for example, an information processing system comprising a plurality of programs for outputting an I/O request, which is a request to write or read data into/from a storage device, upon execution by a processor, and a storage control device which receives the output I/O request and writes or reads data into/from the storage device in accordance with the I/O request, is also known. Occasionally, the performance requirements (for example, specifications or the performance requirements of a user) demanded respectively of the plurality of programs differ from each other. For example, a first program may be required to perform high speed processing (accessing a storage device, for example), whereas a second program may not be required to perform processing at such a high speed as the first program.

It is therefore an object of the present invention to enable processing to be performed in accordance with the performance requirement of a program.

Other objects of the present invention will become clear from the following description.

BRIEF SUMMARY OF THE INVENTION

An information processing method according to a first aspect of the present invention is as follows, for example.

At least one processor for executing a plurality of programs, a storage area which is capable of storing an information element temporarily, and a storage device which is capable of storing the information element are provided. A certain level of importance is associated with each of the programs themselves or the various performance requirements of the programs. When a certain information element is output as a result of execution of a certain program from among the plurality of programs, the certain information element is written into the storage area, and a plurality of the information elements written in the storage area are output to the storage device side in order of precedence from the information element of the executed program, or the performance requirement thereof, having the highest level of importance.

This information processing method may be performed by a business computer to be described below, a storage control device to be described below, a management computer to be described below, or by at least two of these devices in cooperation, for example.

In an embodiment, the storage area may comprise two or more input storage areas and one or more output storage areas. A program or the performance requirement thereof may be associated with each of the two or more input storage areas. The certain information element may be written into the input storage area of the two or more input storage areas that corresponds to the certain program or the performance requirement thereof. Information elements may be moved to the output storage area in order of precedence from the input storage area corresponding to the program, or performance requirement thereof, having the highest level of importance, and the information elements moved to the output storage area may then be output. Further, the maximum number of information elements that can be moved from each input storage area may be calculated for each input storage area on the basis of a total number of information elements stored in the two or more input storage areas and the level of importance corresponding to each program or each performance requirement associated with each input storage area, and the information elements may be moved to the output storage area in a number that is equal to or less than the calculated maximum number.

In an embodiment, an information element addressed to at least one of the programs may be received from the storage device side, and the received information element may be written into the storage area. A plurality of the information elements written into the storage area may be output in order of precedence from the information element that is addressed to the program having the highest level of importance or the program whose performance requirement has the highest level of importance.

An information processing method according to a second aspect of the present invention is as follows, for example.

One or a plurality of host devices for transmitting an information element output as a result of execution, by at least one processor, of one or a plurality of programs, and one or a plurality of storage control devices for accessing a storage device by receiving and processing the information element, are connected communicably via a communication network. At least one sub-time length is specified from among a plurality of sub-time lengths relating to a length of time required for exchange between each program and the storage device. A determination is performed as to whether or not the specified sub-time length is flawed. If the result of the determination indicates that the specified sub-time length is flawed, response processing to shorten the specified sub-time length is executed.

In an embodiment, at least one of the host device and the storage control device may comprise an input storage area and an output storage area to which a part of a storage resource provided in the device is allocated, and a storage area control portion for receiving an information element. Processing may be performed by the storage area control portion in the device to write the received information element into the input storage area, read the information element from the input storage area, write the read information element into the output storage area, and output the information element written in the output storage area. The specified sub-time length may be a first sub-time length comprising a time length which extends from reception of the information element by the storage area control portion to output of the information element from the output storage area. Processing to increase the amount of storage allocated to the input storage area and raise the reading speed from the input storage area may be executed as the response processing to shorten the first sub-time length.

In an embodiment, at least one of the host device and the storage control device may comprise a storage area to which a part of a storage resource provided in the device is allocated, and a storage area control portion for receiving an information element. A certain level of importance may be associated with each of the programs themselves, or the various performance requirements of the programs. Processing may be performed by the storage area control portion in the device to write the received information element into the storage area, and output a plurality of the information elements written in the storage area in order of precedence from the information element of the executed program, or the performance requirement thereof, having the highest level of importance. The specified sub-time length may be a second sub-time length comprising a time length which extends from reception of the information element by the storage area control portion to output of the information element from the output storage area. Processing to increase the level of importance corresponding to a certain program or the performance requirement thereof may be performed as the response processing to shorten the second sub-time length in relation to the certain program.

In an embodiment, the specified sub-time length may be a communication time length required for transmission and reception of the information element between the host device and storage control device. Processing to modify a communication path, or increase a communication band, between the host device and storage control device may be performed as the response processing to shorten the communication time length.

In an embodiment, the storage control device may comprise a cache area. The plurality of programs may comprise a first program and a second program. A high performance requirement may be allocated to the first program, and a low performance requirement may be allocated to the second program. A first cache sub-area corresponding to the high performance requirement, and a second cache sub-area corresponding to the low performance requirement, may be provided in the cache area. The first cache sub-area may be used when processing an information element output as a result of execution of the first program, and the second cache sub-area may be used when processing an information element output as a result of execution of the second program. The specified sub-time length may be a third sub-time length comprising a time length required for the processing using the cache area. The storage capacity of the first cache sub-area may be increased as the response processing to shorten the third sub-time length in relation to the first program corresponding to the high performance requirement.

In an embodiment, a management device connected communicably to the host device and the storage control device may be provided. At least one of the host device and the storage control device may transmit to the management device at least one of the plurality of sub-time lengths or a parameter required to specify the sub-time length. The management device may receive the sub-time length or the parameter from the device, learn the sub-time length from the received sub-time length or parameter, determine whether or not the learned sub-time length is flawed, and if the sub-time length is flawed, command the device to execute response processing to shorten the learned sub-time length.

An information processing method according to a third aspect of the present invention is as follows, for example.

One or a plurality of host devices for generating and transmitting an information element are connected communicably to a storage control device for accessing a storage device by receiving and processing the information element. The storage control device comprises a cache area. The one or more host devices comprise at least one processor and a plurality of programs executed by the at least one processor. The plurality of programs comprises a first program to which a high performance requirement is allocated and a second program to which a low performance requirement is allocated. The cache area comprises a first cache sub-area corresponding to the high performance requirement and a second cache sub-area corresponding to the low performance requirement. The first cache sub-area is used when processing an information element output as a result of execution of the first program, and the second cache sub-area is used when processing an information element output as a result of execution of the second program. The processing speed of an information element output as a result of execution of the first program corresponding to the high performance requirement is raised by increasing the storage capacity of the first cache sub-area.

In an embodiment, when an information element output as a result of execution of the first program is processed to access the storage device, a certain location in the first cache sub-area may be secured, and the information element may be exchanged between the storage device and the program corresponding to the high performance requirement via the secured location.

In an embodiment, when an information element is stored in advance in both the first cache sub-area and the second cache sub-area, and the pre-stored information element is transmitted to the program such that the information element is supplied to the program without accessing the storage device, the storage capacity of the first cache sub-area may be reduced, data stored in the reduced part may be held in the storage device, and all or a part of the reduced storage capacity may be added to the storage capacity of the second cache sub-area. Furthermore, the storage capacity of the first cache sub-area may be increased, and the data moved to the storage device may be returned from the storage device to the increased part.

The processing in the information processing method described above may be executed using hardware, a computer program, or a combination thereof. More specifically, for example, the processing may be executed using a processor into which a computer program has been read. Further, the computer program may be recorded onto a recording medium (for example, a CD-ROM or DVD (Digital Versatile Disk)), loaded from the recording medium, and installed onto a computer such that the computer device becomes a dedicated device for performing the information processing method described above. Furthermore, the computer program described above may be loaded onto the computer device via a communication network.

BRIEF DESCRIPTION OF THE DRAWINGS

FIG. 2 is a block diagram illustrating the functions of the information processing system shown in FIG. 1;

FIG. 3 illustrates a storage control device 27 shown in FIG. 2 in further detail;

FIG. 5A shows a constitutional example of configuration information that is constructed in the information processing system shown in the example in FIG. 4B, FIG. 5B shows a constitutional example of ST configuration information 82, and FIG. 5C shows a constitutional example of VOL configuration information 83;

FIG. 6A shows a constitutional example of SC information 84, and FIG. 6B shows a constitutional example of storage control information included in SC information elements 84R;

FIG. 7A shows a constitutional example of detailed information relating to a storage virtual computer 61, and FIG. 7B shows a constitutional example of SC management information 85;

FIG. 8A shows a constitutional example of BC information 86, and FIG. 8B shows a constitutional example of management information 703 that can be set in a management computer 5;

FIG. 9A is an illustrative view of measures taken in a business computer 17 to perform processing in accordance with the performance requirement of a business AP.

FIG. 13A shows a constitutional example of a business ID management table 926, and FIG. 13B shows a constitutional example of a buffer management table 925;

FIG. 14 shows the flow of processing performed in the information processing system according to the first embodiment of the present invention;

FIG. 15A shows an example of a time length table 940, and FIG. 15B shows an example of a response processing table 1013 prepared for each business ID;

FIG. 18B shows a constitutional example of a buffer management table 1425;

FIG. 22 shows an example of a cache area 212 in a third embodiment of the present invention.

DETAILED DESCRIPTION OF THE PREFERRED EMBODIMENTS

Several embodiments of the present invention will be described below with reference to the drawings.

First Embodiment

Figure 1:
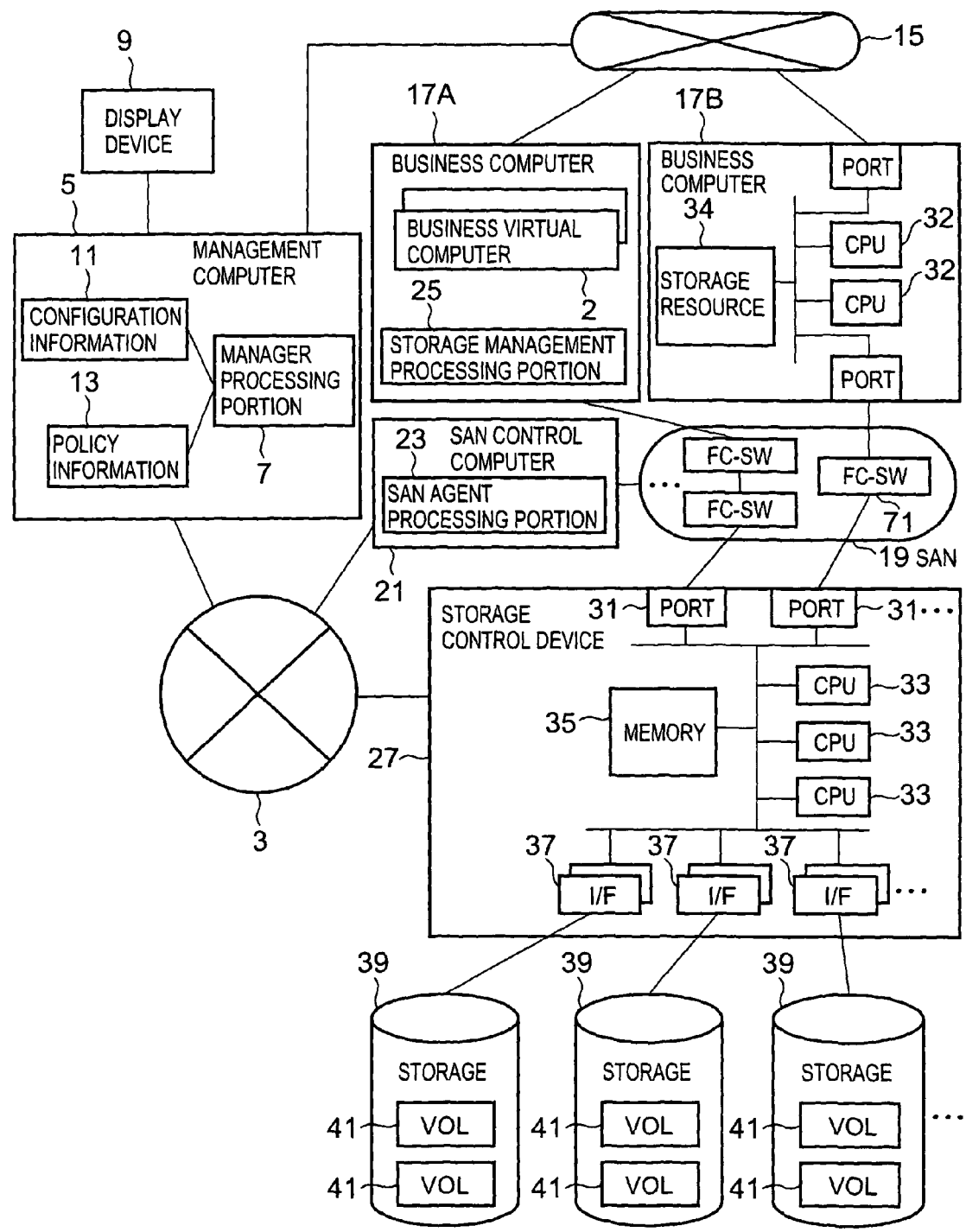
FIG. 1 shows in outline a constitutional example of an information processing system according to a first embodiment of the present invention.

FIG. 1 shows in outline a constitutional example of an information processing system according to a first embodiment of the present invention. Note that in the following description, when it is unnecessary to differentiate between like constitutional elements, only a parent numeral is used, but when it is necessary to differentiate between like constitutional elements, a branch numeral may be affixed to the parent numeral. Further, for ease of understanding, a branch numeral may not be used in the description even when the branch numeral is affixed in the drawings.

A plurality of (two in the illustrated example) business computers 17 and a management computer 5 are connected to a first communication network (for example, a LAN (Local Area Network) or the Internet) 15. The plurality of business computers 17 is also connected to a SAN (Storage Area Network) 19. A storage control device 27 and a SAN control computer 21 are connected to the SAN 19. The SAN control computer 21 is also connected to a second communication network 3. The aforementioned management computer 5 is connected to the second communication network (for example, a LAN or the Internet). The first communication network 15, second communication network 3, and SAN 19 do not necessarily have to be separate communication networks as described above, and at least two thereof may be constituted as a common network, for example.

At least one of the SAN control computer 21, the business computers 17, and the management computer 5 may be constituted by a personal computer, a workstation, a mainframe, or a server machine, for example. These computers 17, 21, and 5 may have substantially identical hardware configurations. In other words, taking the illustrated business computer 17B as a representative example, each computer 17, 21, and 5 may comprise one or more CPUs 32, a storage resource 34, and a port for connecting the computer to a communication network. The storage resource 34 may be constituted by one or a plurality of physical storage devices, for example, such as at least one memory and/or at least one disk type storage device (a hard disk, for example). The storage resource 34 of each computer 17, 21, and 5 is capable of storing one or more computer programs. The at least one CPU 32 is capable of reading the computer program from the storage resource 34 and executing the computer program.

The business computers 17 are used to execute predetermined business. Examples of this business include processing as a WEB server to provide a client machine, not shown in the drawing, with information, processing to provide the client machine, not shown in the drawing, with online services (for example, processing to receive a request to transfer funds from the bank account of the client to another bank account, and respond to the received request by executing the transfer), transaction processing, batch processing, and so on. For example, the business computers 17 may comprise a storage management processing portion 25 and one or a plurality of virtual computers (business virtual computers hereafter) 2. The business virtual computer 2 may be generated and deleted dynamically, and hence there may be cases where no business virtual computers 2 exist, and cases where many business virtual computers 2 exist in the business computers 17.

The management computer 5 is capable of managing the information processing system according to this embodiment. The storage resource of the management computer 5 is capable of storing configuration information 11, comprising information relating to various configurations, and policy information 13 relating to the conditions for executing predetermined processing. The management computer 5 may comprise a manager processing portion 7. By gathering various information from the business computer 17 and storage control device 27, the manager processing portion 7 is capable of constructing the configuration information 11 and displaying the obtained information on a display device (for example, a display screen of the client machine) 9 which is connected communicably to the management computer 5.

The SAN 19 may be constituted by a plurality of fiber channel switches (FC-SW hereafter) 71, for example. As a result of this constitution, the number of FC-SWs 71 existing on a communication path linking a first business computer 17A and the storage control device 27 may differ from the number of FC-SWs 71 existing on a communication path linking the second business computer 17B and the storage control device 27, for example. The number of FC-SWs 71 existing on a communication path may be expressed as the "communication path length".

The SAN control computer 21 manages the SAN 19, and may comprise a SAN agent processing portion 23. The SAN agent processing portion 23 will be described hereafter.

The storage control device 27 is capable of controlling one or more (three in the illustrated example) storages (hard disk drives, for example) 39 connected thereto. For example, the storage control device 27 may comprise one or more (two in the illustrated example) ports for connecting the storage control device 27 to the SAN 19, one or more CPUs 33, at least one memory 35, and one or more storage interface devices (abbreviated to I/F hereafter) 37 connected respectively to the one or more storages 39. The I/Fs 37 connected to the storages 39 may be multiplexed (doubled, for example).

A logical volume (occasionally abbreviated to VOL hereafter) 41 may be set in each of the plurality of storages 39. One logical volume 41 may be provided in each storage 39, as shown in the drawing, or provided over a plurality of the storages 39.

FIG. 2 is a block diagram illustrating the functions of the information processing system shown in FIG. 1. Note that in the following description, to avoid lengthy descriptions and improve readability, the terms "storage", "storage control device", "storage virtual computer", "business computer", and "business virtual computer" are occasionally abbreviated to "ST", "SC", "SVC", "BC", and "BVC", respectively.

The manager processing portion 7 of the management computer 5 is capable of gathering various information from the business computers 17, storage control device 27, and SAN control computer 21, and constructing the configuration information 11 on the basis of the gathered information. More specifically, for example, the manager processing portion 7 is capable of constructing ST configuration information 82 (see FIG. 5B), VOL configuration information 83 (see FIG. 5C), SC information 84 (see FIGS. 6A to 7A), and SC management information 85 (see FIG. 7B) included in the configuration information 11 (see FIG. 5A), as described below, by gathering one or more ST configuration information elements 82R, one or more VOL configuration information elements 83R, one or more SC information elements 84R, and one or more SC management information elements 85R from each of the storage control devices 27. Further, for example, the manager processing portion 7 is capable of constructing BC information 86 (see FIG. 8A) included in the configuration information 11, as described below, by gathering one or more BC information elements 86R from each of the business computers 17. These processes will be described in detail hereafter.

Returning to FIG. 2, the manager processing portion 7 is capable of transmitting to the business computer 17 management information (for example, information indicating the logical volumes 41 that can be accessed from each port of the business computer 17 via each port 31 of each storage control device 27) 703, which can be learned from the configuration information 11 and SAN configuration information 701.

The SAN agent processing portion 23 is capable of managing information 701 relating to the configuration of the SAN 19 (SAN configuration information hereafter) in the storage resource of the SAN control computer 21. The SAN configuration information 701 may be constituted by information (see FIG. 4B) indicating the FC-SWs 71 that exist between each business computer 17 and each storage control device 27, the FC-SWs 71 that are connected to each FC-SW 71, and so on, for example.

The one or more CPUs, the storage resource, and so on provided in the business computer 17 may be considered as a business computer resource pool 22. The business computer 17 may be provided with the business virtual computer 2, which is allocated a part or all of the resource pool 22. Hence, although not illustrated in the drawing, the business virtual computer 2, similarly to a storage virtual computer 61 to be described below, may comprise a virtual CPU and a virtual storage resource. By means of this virtual CPU, the business virtual computer 2 is capable of executing an application program 4 (business AP hereafter) for performing predetermined business.

The storage management processing portion 25 is capable of generating the business virtual computer 2, comprising all or a part of the business computer resource pool 22 (for example, a usage proportion of at least one of the CPUs 32 and a storage area of the storage resource 34), in the business computer 17. Conversely, the storage management processing portion 25 is also capable of deleting the business virtual computer 2 by releasing the part of the resource pool provided in the business virtual computer 2. Then, based on the generation, deletion, and so on of the business virtual computer 2, the storage management processing portion 25 is capable of updating at least one of the one or more BC information elements 86R stored in the storage resource of the business computer 17. Further, when a predetermined event occurs (for example, a request is received from the manager processing portion 7 or the BC information elements 86R are updated), the storage management processing portion 25 is capable of transmitting all or a part (only the updated information element, for example) of the one or more BC information elements 86R to the manager processing portion 7. The storage management processing portion 25 is also capable of receiving the management information 703 from the manager processing portion 7 and writing the received management information 703 into the storage resource of the business computer 17.

The storage area of the storages 39 may be considered as a resource pool 28 of the storages 39. The logical volumes 41 may be provided in all or a part of this resource pool 28.

FIG. 3 illustrates the storage control device 27 shown in FIG. 2 in further detail. The storage control device 27 will now be described with reference to FIGS. 2 and 3.

The hardware group (for example, the one or more CPUs 33, at least one memory 35, one or more ports 31, and one or more I/Fs 37) provided in the storage control device 27 may be considered as a storage control device resource pool 26. Various information, such as the one or more ST configuration information elements 82R, one or more VOL configuration information elements 83R, one or more SC information elements 84R, and one or more SC management information elements 85R, for example, is stored in the storage resources of the resource pool 26.

The storage control device 27 comprises a storage agent processing portion 282, a virtual computer processing portion 93, and a buffer control processing portion 409. The storage agent processing portion 282 and virtual computer processing portion 93 may be constituted by hardware, computer programs, or a combination thereof, but in this embodiment, it is assumed that the storage agent processing portion 282 and virtual computer processing portion 93 are constituted by computer programs (likewise regarding the manager processing portion 7, SAN agent processing portion 23, storage management processing portion 25, virtual computer processing portion 93, and buffer control processing portion 409). Hence, the storage agent processing portion 282 and virtual computer processing portion 93 can be operated by being read from the at least one memory 35 into the CPU 33, for example.

The storage agent processing portion 282 is capable of monitoring the state of the resource pool 26 of the storage control device 27 (for example, the usage proportion of the CPUs 33, the usable capacity of the memory 35, the number of existing storage virtual computers 61, which part of the resource pool 26 is allocated to which virtual computer, and soon), for example. Further, the storage agent processing portion 282 is capable of updating at least one of the one or more ST configuration information elements 82R, one or more VOL configuration information elements 83R, one or more SC information elements 84R, and one or more SC management information elements 85R on the basis of the monitoring result. Further, for example, when a predetermined event occurs (for example, a request is received from the manager processing portion 7 or at least one of the information elements 82R, 83R, 84R, 85R is updated), the storage agent processing portion 282 is capable of transmitting at least one of the information elements 82R, 83R, 84R, 85R (only the updated information element, for example) to the manager processing portion 7. Further, for example, the storage agent processing portion 282 is capable of causing the virtual computer processing portion 93 to generate or delete the storage virtual computer 61 on the basis of the aforementioned monitoring result.

The virtual computer processing portion 93 is capable of generating or deleting the virtual computer (storage virtual computer hereafter) 61, allocated all or a part of the storage control device resource pool 26, under the control of the storage agent processing portion 282. Further, the virtual computer processing portion 93 is capable of obtaining from the memory 35, for example, a priority policy 92 describing conditions relating to various priorities (for example, the order of precedence of each virtual computer and the order of processing precedence), and is also capable of specifying priority information (for example, information indicating which processing should be performed over which processing) 94 to be set in the generated storage virtual computer 61 by referring to the priority policy 92, and setting the specified priority information 94 in the storage virtual computer 61. The storage virtual computer 61 shown as an example in FIG. 3 comprises an allocated CPU resource (for example, all or a part (a usage proportion, for example) of one or a plurality of the CPUs 33) as a virtual CPU 63, and also comprises an allocated memory resource (for example, all or a part of one or a plurality of the memories 35) as a virtual memory 65, a virtual port buffer 51, and a virtual I/F buffer 53. The port buffer 51 is capable of storing information elements (requests or data packets, for example) to be input or output into/from the port 31. The I/F buffer 53 is capable of storing information elements to be input or output into/from the I/F 37.

The buffer control processing portion 409 may be activated when the number of storage virtual computers 61 existing in the storage control device 27 switches from zero to one, for example, and halted when the number returns to zero. Further, for example, the buffer control processing portion 409 is capable of generating or deleting the port buffer 51 or I/F buffer 53 in at least one of the one or more storage virtual computers 61 in accordance with an instruction from the storage agent processing portion 282 (at this time, the buffers 51 may be allocated to the ports 31 (or the buffers 53 may be allocated to the I/Fs 37) in a ratio of 1:1, N:1 (where N is an integer of 2 or more), or 1:N) Further, for example, the buffer control processing portion 409 is capable of monitoring the state of the buffers 51, 53 (for example, the respective numbers of buffers 51, 53, the number of information elements accumulated in the buffers 51, 53, and so on) in each storage virtual computer 61, and notifying the storage agent processing portion 282 of the monitoring result.

The various elements of the information processing system according to this embodiment will now be described in detail.

Figure 4A:
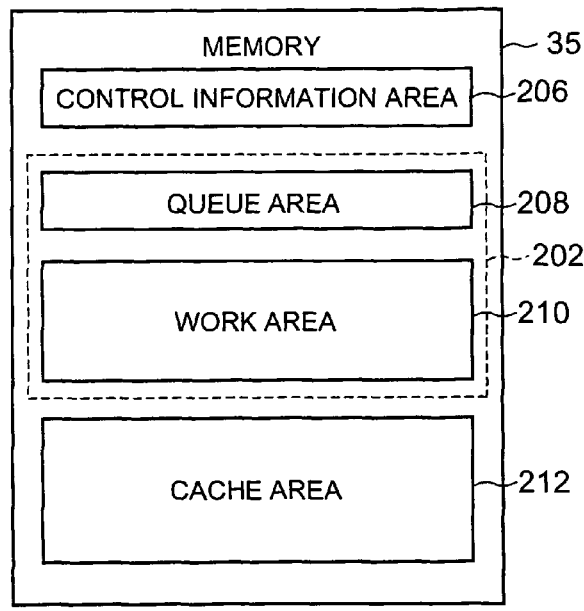
FIG. 4A shows an example of usage of a storage area of at least one memory 35 in the storage control device 27.

FIG. 4A shows an example of usage of the storage area of the at least one memory 35 in the storage control device 27.

A control information area 206, a storage virtual computer area 202, and a cache area 212, for example, are provided in the storage area of the at least one memory 35.

Information relating the constitution of the storage control device 27, information relating to the plurality of storages 39 connected to the storage control device 27, and so on are stored in the control information area 206.

The storage virtual computer area 202 is provided for each storage virtual computer 61. Hence, when M (where M is an integer of 0 or more) storage virtual computers 61 exist, M storage virtual computer areas 202 also exist. A buffer area 208 and a work area 210 are provided in each storage virtual computer area 202. The buffer area 208 is used as the port buffer 51 and I/F buffer 53. The work area 210 is used as the virtual memory 65.

The cache area 212 is for storing data exchanged between the business computer 17 and storage 39 temporarily. More specifically, when the storage virtual computer 61 receives data to be written and a write request from the business computer 17, for example, the data to be written may be stored temporarily in the cache area 212, read from the cache area 212, and then written into the logical volume 41. Further, when the storage virtual computer 61 receives a read request from the business computer 17, for example, the data to be read may be read from the logical volume 41, stored temporarily in the cache area 212, read from the cache area 212, and then transmitted to the business computer 17.

Figure 4B:
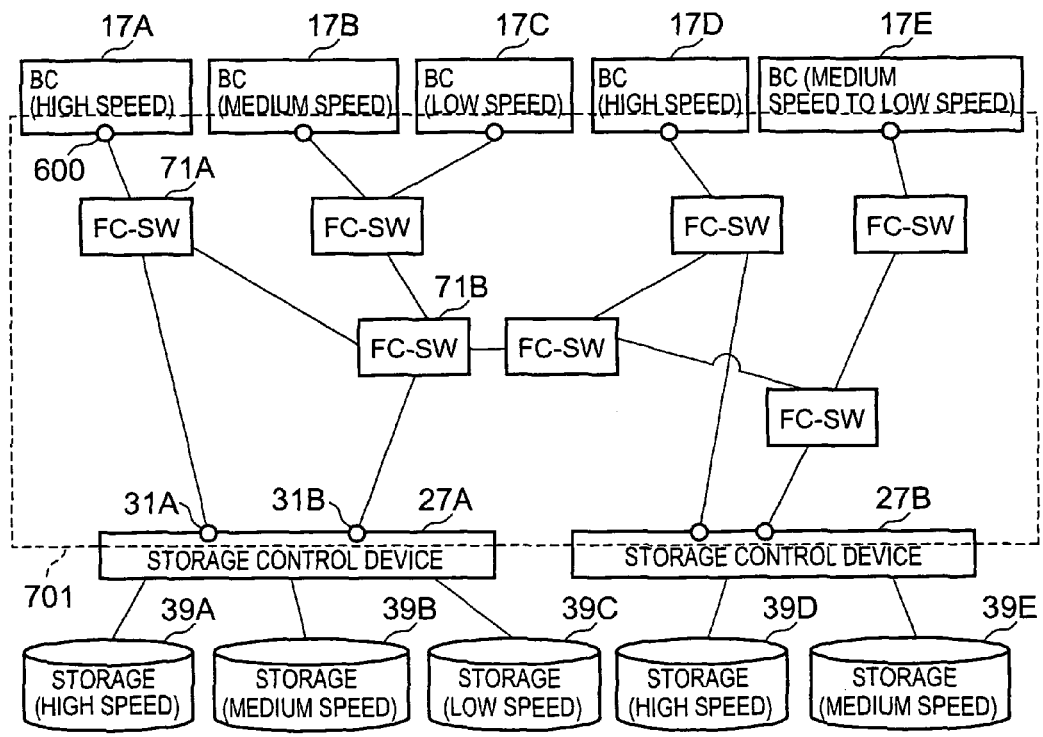
FIG. 4B shows a schematic example of SAN configuration information 701 that is managed by a SAN agent processing portion 23.

FIG. 4B shows a schematic example of the SAN configuration information 701 managed by the SAN agent processing portion 23.

As described above, the SAN configuration information 701 may be constituted by information indicating the FC-SWs 71 that exist between each port of each business computer 17 and each port 31 of each storage control device 27, which FC-SWs 71 are connected to which FC-SWs 71, and so on. More specifically, for example, the SAN configuration information may comprise an ID for the port of the business computer 17, an ID for the port of the storage control device 27, and one or more IDs corresponding respectively to the one or more FC-SWs existing between these ports, for each of the communication paths between each business computer 17 and each storage control device 27. The one or more IDs corresponding respectively to the one or more FC-SWs may be arranged in order of connection from the business computer 17 to the storage control device 27.

The SAN agent processing portion 23 is capable of specifying the configuration shown in the example in FIG. 4B by referring to the SAN configuration information 701. More specifically, for example, the SAN agent processing portion 23 learns that a port 600 of the business computer 17A is connected to a first port 31A of the storage control device 27A via an FC-SW 71A. Further, for example, the SAN agent processing portion 23 learns that the port 600 of the business computer 17A is connected to a second port 31B of the storage control device 27A via the FC-SW 71A and an FC-SW 71B.

Next, the configuration information 11 constructed by the manager processing portion 7 of the management computer 5 will be described. Before that, however, a more specific constitutional example of the information processing system according to this embodiment will be described using FIG. 4B.

In this embodiment, it is assumed that at least business computers 17A to 17E exist, for example. It is also assumed that of these business computers 17A to 17E, the business computers 17A and 17D have a high processing speed (for example, comprise a CPU with a large operating frequency), the business computer 17B has a medium processing speed, and the business computer 17C has a low processing speed. The business computer 17E, for example, is assumed to be loaded with a plurality of blade type computers (so-called blade servers, for example), and has either a medium or a low processing speed. Note that here, the processing speed is used as the performance requirement of the business computer 17, but other performance requirements may be used instead of, or in addition to, the processing speed. Furthermore, the processing speed is not limited to three levels, namely high, medium, and low, and may be separated into more or less levels.

It is also assumed that at least storage control devices 27A and 27B exist. Storages 39A to 39C are connected to the storage control device 27A, and storages 39D and 39E are connected to the storage control device 27B. The storages 39A and 39D have a high writing speed, the storages 39B and 39E have a medium writing speed, and the storage 39C has a low writing speed. Note that here, the writing speed is used as a performance requirement of the storages 39, but other performance requirements (reliability, for example (as a specific example thereof, the MTBF (Mean Time Between Failure) may be cited)) may be used instead of, or in addition to, the writing speed. Furthermore, the writing speed is not limited to three levels, namely high, medium, and low, and may be separated into more or less levels.

Within this constitution, the configuration information 11 is constructed as described below, for example.

FIG. 5A shows a constitutional example of configuration information constructed in the information processing system shown as an example in FIG. 4B.

As shown in the drawing, the configuration information 11 comprises the ST configuration information 82, VOL configuration information 83, SC information 84, SC management information 85, and BC information 86. Of this information, the manager processing portion 7 is capable of constructing the ST configuration information 82, VOL configuration information 83, SC information 84, SC management information 85, and BC information 86 from the one or more ST configuration information elements 82R, one or more VOL configuration information elements 83R, one or more SC information elements 84R, one or more SC management information elements 85R, and one or more BC information elements 86R gathered thereby.

Each type of information will now be described.

FIG. 5B shows a constitutional example of the ST configuration information 82.

The ST configuration information 82 is constituted by the plurality of ST configuration information elements (records, for example) 82R, and relates to each of the plurality of storages 39 provided in the information processing system according to this embodiment, for example. Each ST configuration information element 82R comprises, for example, a "storage name", which is the name of the storage 39 corresponding to the element 82R, a "storage capacity", which is the storage capacity of the storage 39, a "used storage capacity", which is the storage capacity of the storage 39 that is used as the VOL 41, and a "performance", indicating the writing speed of the storage 39. Note that each ST configuration information element 82R may also comprise information (the name of the storage control device 27, for example) expressing the storage control device 27 to which the storage 39 is connected, for example. Further, the storage 39 may be specified by a multiple ID rather than a name (likewise in the case of the other elements to be described below). The information indicating high speed, medium speed, and low speed in the "performance" section may be set manually, for example, or may be set automatically on the basis of a predetermined rule (for example, a rule whereby a certain writing speed range corresponds to a certain speed).

By referring to the ST configuration information 82, it is possible to determine the number of storages 39 in the information processing system according to this embodiment, the performance level of each storage 39, the storage capacity thereof, and the storage capacity that is allocated as the VOL 41, for example.

FIG. 5C shows a constitutional example of the VOL configuration information 83.

The VOL configuration information 83 is constituted by the plurality of VOL configuration information elements (records, for example) 83R, and relates to each of the plurality of VOLs 41 provided in the information processing system according to this embodiment, for example. Each VOL configuration information element 83R comprises, for example, a "storage name" of the storage 39 comprising the VOL 41 corresponding to the element 83R, a "VOL name", which is the name of the VOL 41, a "VOL capacity", which is the storage capacity of the VOL 41, and a "used VOL capacity", which is the storage capacity of the VOL 41 that is in use (for example, the capacity occupied by information).

By referring to the VOL configuration information 83, it is possible to determine the VOLs 41 that exist in each storage 39 in the information processing system according to this embodiment. Further, by referring to the storage configuration information 82 shown in the example in FIG. 5B, the performance and so on of the storage 39 can be learned.

FIG. 6A shows a constitutional example of the SC information 84.

The SC information 84 is constituted by the plurality of SC information elements (records, for example) 84R, and relates to each of the storage control devices 27 provided in the information processing system according to this embodiment, for example. Each SC information element 84R comprises, for example, an "SC name", which is the name of the storage control device 27 corresponding to the element 84R, a "number of connected storages", which is the number of storages 39 connected to the storage control device 27, "storage control information", which is control information relating to the storage control device 27, and "connected storage information", which is information relating to the connected storages 39. The connected storage information includes the "ST name" of each connected storage, for example.

FIG. 6B shows a constitutional example of the storage control information included in the SC information element 84R.

The storage control information comprises, for example, a "number of loaded ports", which is the number of ports 31 loaded in the storage control device 27 corresponding to the element 84R, "loaded port information", which is information relating to each port 31, and a "number of loaded I/Fs", which is the number of I/Fs 37 loaded in the storage control device 27. The storage control information also comprises, for example, "loaded I/F information", which is information relating to the I/F 37, a "number of SVCs", which is the number of storage virtual computers 61 existing in the storage control device 27, and "SVC information", which is information relating to the storage virtual computer 61. Further, the storage control information comprises, for example, a "number of loaded CPUs", which is the number of CPUs 33 loaded in the storage control device 27, and a "loaded memory capacity", which is the storage capacity provided by the at least one or more memories 35 loaded into the storage control device 27. The symbols n, m, p, and e in the drawing denote values, and the symbol f is a numerical value in megabyte units, for example.

For each storage virtual computer 61, the SVC information comprises, for example, an "SVC name", which is the name of the storage virtual computer 61, and a "presence of detailed information", which indicates whether or not detailed information is provided for the storage virtual computer 61.

FIG. 7A shows a constitutional example of the detailed information for the storage virtual computer 61.

The detailed information relating to the storage virtual computer 61 comprises, for example, a "number of used ports", which is the number of ports 31 allocated to the storage virtual computer 61, "used port information", which is information relating to each port 31, a "number of used I/Fs", which is the number of I/Fs 37 allocated to the storage virtual computer 61, and "used I/F information", which is information relating to each I/F 37. The detailed information also comprises, for example, a "number of used CPUs", which is the number of CPUs 33 allocated to the storage virtual computer 61, "used CPU information", which is information relating to each CPU 33, and a "used memory capacity", which is the capacity of the memory 35 allocated to the storage virtual computer 61 (the symbol y in the drawing is a numerical value in megabyte units, for example). Further, the detailed information comprises, for example, a "number of port buffers", which is the number of port buffers 51 existing in the storage virtual computer 61, "port buffer information", which is information relating to each port buffer 51, a "number of I/F buffers", which is the number of I/F buffers 53 existing in the storage virtual computer 61, and "I/F buffer information", which is information relating to each I/F buffer 53.

The used port information comprises, for example, a "port name" of each port 31, and the number of port names is the same as the "number of used ports". The used I/F information comprises, for example, an "I/F name" of each I/F 37, and the number of I/F names is the same as the "number of used I/Fs". The used CPU information comprises, for example, a set comprising a "CPU name" and a "CPU usage proportion" for each CPU 33, and the number of sets is the same as the "number of CPUs". Here, the "CPU usage proportion" may indicate the allocated usage ratio or the actual proportion of the CPU currently in use. In terms of the example in FIG. 7A, of the three CPUs 33A to 33C, 100% of the CPU 33A, 50% of the CPU 33B, and 80% of the CPU 33C are allocated, and this may indicate that the virtual CPU 63 has been allocated to the storage virtual computer 61 and the virtual CPU 63 may be used within the allocated range, or that all of the three CPUs 33A to 33C are allocated, and at a certain usage point, 100% of the CPU 33A, 50% of the CPU 33B, and 80% of the CPU 33C are in use.

By referring to this SC information 84, it is possible to determine which storage control devices 27 exist in the information processing system according to this embodiment, which storage virtual computers 61 exist in each storage control device 27, and so on, for example. By referring to the information 82, 83 shown in the examples in FIGS. 5B and 5C, it is also possible to determine the storages 39 that are connected to each storage control device 27.

FIG. 7B shows a constitutional example of the SC management information 85.

The SC management information 85 is constituted by the plurality of SC management information elements (records, for example) 85R, and expresses the structure of the logical paths between each port 31 of the storage control devices 27 and each VOL 41. Each SC management information element 85R comprises, for example, a "VOL name" of the VOL 41 at one end of a path, an "SVC name" of the storage virtual computer 61 capable of accessing the VOL 41, a "port name" of the port 31 allocated to the storage virtual computer 61, and an "I/F name" of the I/F 37.

By referring to the SC management information 85, it is possible to learn, for example, that information input through the port 31A is received by a storage virtual computer 61A, and that the storage virtual computer 61A writes this information into a VOL 41A via the I/F 37A.

The storage virtual computer 61 is capable of controlling data exchange between the business virtual computer 2 and VOL 41 in accordance with the SC management information elements 85R. For example, the storage virtual computer 61 is capable of receiving a write request and write subject data from the business virtual computer 2 via the port 31 having the port name which corresponds to the SVC name of the storage virtual computer 61 itself, writing the write subject data into the cache area 212 of the memory 35 temporarily, and writing the write subject data written into the cache area 212 into the VOL 41 having the VOL name that corresponds to the SVC name of the storage virtual computer 61 itself via the I/F 37 having the I/F name that corresponds to the SVC name of the storage virtual computer 61 itself. The storage virtual computer 61 is also capable of receiving a read request from the business virtual computer 2 via the port 31 having the port name which corresponds to the SVC name of the storage virtual computer 61 itself, reading the read subject data corresponding to the read request from the VOL 41 having the VOL name that corresponds to the SVC name of the storage virtual computer 61 itself via the I/F 37 having the I/F name that corresponds to the SVC name of the storage virtual computer 61 itself, writing the read subject data read from the VOL 41 into the cache area 212 of the memory 35 temporarily, and then transmitting the read subject data written into the cache area 212 to the business virtual computer 2 which transmitted the read request via the port 31 having the port name which corresponds to the SVC name of the storage virtual computer 61 itself.

The SC management information elements 85R may be added to, deleted, or updated every time the storage virtual computer 61 is generated, deleted, copied, subjected to condition modification, and so on in accordance with a request from the manager processing portion 7 received via the storage agent processing portion 282, for example.

FIG. 8A shows a constitutional example of the BC information 86.

The BC information 86 is constituted by the plurality of BC information elements (records, for example) 86R, and relates to the plurality of business computers 17 provided in the information processing system according to this embodiment. Each BC information element 86R comprises, for example, a "BC name", which is the name of the business computer 17 corresponding to the element 86R, and a "port name" of the port 600 provided in the business computer 17. The BC information elements 86R further comprise, for example, information relating to a computer existing within the business computer 17 corresponding to the element 86R. More specifically, for example, when a business virtual computer exists in the business computer 17, the name of the business virtual computer and information relating to a business AP that can be executed by the business virtual computer (for example, the AP name, performance requirement, and business ID) are included. On the other hand, if no business virtual computers exist in the business computer 17, each business AP provided in the business computer 17 comprises the AP name, performance requirement, and business ID as information relating to the business AP, for example. The performance requirement of the business AP is the performance requirement required in the business AP (processing speed, for example), and may be classified as high speed, medium speed, or low speed, for example. The business ID is an ID that can be recognized uniquely in the information processing system according to this embodiment, and may be constituted by information comprising the AP name of the business AP and the BC name of the business computer 17 comprising the business AP, for example.

By referring to the BC information 86, it is possible to determine whether or not business virtual computers 2 exist in each business computer 17, and if so, how many business virtual computers 2 exist in each business computer 17. It is also possible to determine the type of business AP 4 that can be executed by each business computer 17 or each business virtual computer 2, and so on, for example.

FIG. 8B shows a constitutional example of the management information 703 that can be set in the management computer.

The management information 703 may be constructed from the SC information 84 and SC management information 85 in the configuration information 11, and the SAN configuration information 701, for example. The management information 703 indicates the business computer 17 that is the transmission destination of the management information 703, and the communication path between this business computer 17 and the storage control device 27, for example. More specifically, for example, the management information 703 comprises, for each communication path, an "SC name" of the storage control device 27 serving as the access destination of the business computer 17, an "access destination port name", which is the name of the port (SC port hereafter) of the storage control device 27 serving as the access destination, an "access source port name", which is the name of the port (BC port hereafter) of the business computer 17 serving as the access source, and a "VOL name" of the VOL 41 serving as the access destination.

The management computer 5 is capable of transmitting this control information 703 to the business computer 17 and storage control device 27. By referring to this management information 703, the business computer 17 and storage control device 27 can learn which logical volume 41 can be accessed from which BC port 600 via which SC port 31 of which storage control device 27.

The various elements of the information processing system according to this embodiment were described above.

The information processing system is devised to perform processing which corresponds to the performance requirement of the business AP. More specifically, in the information processing system, measures are taken so that information elements output by having the CPU 32 execute a business AP having a "high speed" performance requirement are processed at high speed, and information elements output by executing a business AP having a lower performance requirement are processed at a lower speed than the information elements output by executing the business AP having the "high speed" performance requirement. Note that in this embodiment, an "information element" denotes all or a part of a piece of information. The information may be an I/O request (input/output request), which is a write request or read request, write subject information to be written into the storage 39, or read subject information to be read from the storage 39.

These measures will now be described in detail.

FIG. 9A is an illustrative view of the measures taken in the business computer 17 to perform processing in accordance with the performance requirement of the business AP.

It is assumed that the business computer 17 is the business computer 17B having the BC name "BC 17B" (see FIG. 8A). Accordingly, the business computer 17B comprises four business APs 4A to 4D as the plurality of business APs 4. Of the four business APs 4A to 4D, the business AP 4A has the "high speed" performance requirement, the business APs 4B and 4D have the "medium speed" performance requirement, and the business AP 4C has the "low speed" performance requirement.

The storage management processing portion 25 of the business computer 17B comprises an application program interface (API hereafter) 828 for the business APs 4A to 4D. The storage management processing portion 25 is capable of specifying the AP name of the business AP 4 called out to the API 828.

In the first embodiment, a part of the storage resource (one or a plurality of memories, for example) of the business computer 17B is provided with four buffer sets 44A to 44D corresponding respectively to the four business APs 4A to 4D. In other words, one buffer set 44 is provided for each business ID. Taking the buffer set 44A corresponding to the business ID "AP1" (i.e. the business AP 4A) as a representative example of the buffer sets 44, the buffer set 44A is constituted by a first input buffer 44AA in which element sets 980 to be described below, comprising information elements output upon execution of the business AP 4A, are written, and a second output buffer 44AB in which element sets 980 comprising information elements to be output to the business AP 4A are written. Note that the element set 980 is an information group comprising information elements and other types of information. The element sets 980 input into the buffers 44AA and 44AB may be output in order of input or in a different order.

Also in the first embodiment, a part of the storage resource (one or a plurality of memories, for example) of the business computer 17B is provided with a separate buffer set 453 for the element sets 980 that are input and output through a BC port 600B. The separate buffer set 453 is constituted by a first output buffer 453B in which element sets to be output through the BC port 600B are written, and a second input buffer 453A in which element sets 980 to be input through the BC port 600B* are written. The element sets 980 input into the buffers 453A and 453B may be output in order of input or in a different order.

The buffer sets 44A to 44D and separate buffer set 453 are managed by the storage management processing portion 25.

The storage management processing portion 25 comprises a policy agent processing portion 424 which is capable of controlling movement of the element sets 980 from the four first input buffers to the first output buffer 453B. The policy agent processing portion 424 is one of the program modules of the storage management processing portion 25, for example, and is capable of storing a buffer management table 425 for managing weighting of the buffer sets 44A to 44D.

Figures 9B, 9C:
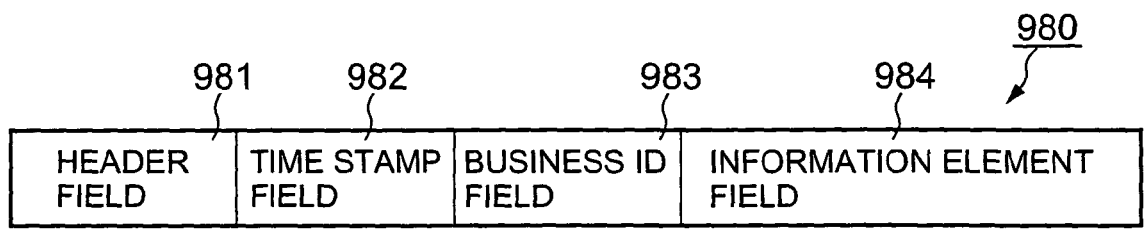
FIG. 9B shows a constitutional example of a buffer management table 425.
FIG. 9C shows a constitutional example of an element set 980.

As shown in the example in FIG. 9B, the business ID of each business AP, the name of the buffer set 44 corresponding to the business ID, and a weighting ratio (in percentage units, for example) of the buffer set 44 are recorded in the buffer management table 425, for example. The weighting ratio of each buffer set 44 is set such that the total value of all of the weighting ratios equals 100%, for example. The weighting ratio may be set by a manager using the management computer 5, or may be modified dynamically and automatically by at least one of the manager processing portion 7 and storage management processing portion 25 in accordance with the policy information 13. In this embodiment, the weighting ratio is set for each business ID, and preferably, the weighting ratio is set on the basis of the performance requirement of the business AP corresponding to the business ID. More specifically, for example, the weighting ratio corresponding to the business ID of the business AP having the "high speed" performance requirement is preferably set to a higher value than the weighting ratio corresponding to the business IDs of the business APs having lower performance requirements. The reason for this is so that processing can be executed in accordance with the performance requirement of the business AP.

On the basis of the buffer management table 425, the policy agent processing portion 424 is able to control the number of element sets 980 that are moved from each first input buffer to the first output buffer 453B.

FIG. 9C shows a constitutional example of the element set 980.

The element sets 980 that are exchanged between the storage management processing portion 25 and storage control device 27 comprise element sets that are transmitted from the storage management processing portion 25 to the storage control device 27, and element sets that are transmitted from the storage control device 27 to the storage management processing portion 25. The latter element set comprises an information element (for example, a response to an I/O request, or all or a part of data read in accordance with a read request) generated in response to the information element in the former element set, for example. Hereafter, the element sets that are transmitted from the storage management processing portion 25 to the storage control device 27 will be referred to as "outbound element sets", the element sets that are transmitted from the storage control device 27 to the storage management processing portion 25 will be referred to as "inbound element sets", and when it is not necessary to differentiate between outbound element sets and inbound element sets, the term "element set" alone will be used.

The element set 980 comprises a header filed 981, a time stamp field 982, a business ID field 983, and an information element field 984, for example. Each field may have a fixed length or a variable length.

The header field 981 is set with predetermined types of information relating to the element set, such as an element set ID, which is information for identifying the element set 980, the VOL name of the logical volume serving as the access destination of the business AP which is the issuing source of the information element, and so on, for example.

The time stamp field 982 is set with one or a plurality of time stamps showing the time. More specifically, for example, when the element set 980 is transmitted from the business computer 17B to the storage control device 27, a time stamp showing the time at which the storage management processing portion 25 receives the information element from the business AP 4 is set in the time stamp field 982. Further, when the element set 980 is transmitted from the storage control device 27 to the business computer 17B, for example, a time stamp showing the transmission time of the element set 980 is set in the time stamp field 982.

The business ID field 983 of the outbound element set is set with the business ID of the business AP which outputs the information element of the outbound element set. The business ID field 983 of the inbound element set is set with the business ID (for example, the business ID in the outbound element set corresponding to the inbound element set) of the business AP which outputs the information element that causes the information element set in the inbound element set to be issued. In other words, the ratio between the number of outbound element sets and inbound element sets may be one to one, a plurality to one, or one to a plurality.

The information element field 984 is set with an information element. Examples of the information element set in the information element field 984 of the outbound element set include all or a part of an I/O request output upon execution of the business AP 4, or all or a part of write subject data. Examples of the information element set in the information element field 984 of the inbound element set include all or a part of read subject data read from the VOL 41, or all or a part of a response issued by the storage control device 27, for example.

The flow of the processing performed in the storage management processing portion 25 of the business computer 17B will now be described.

Figure 10:
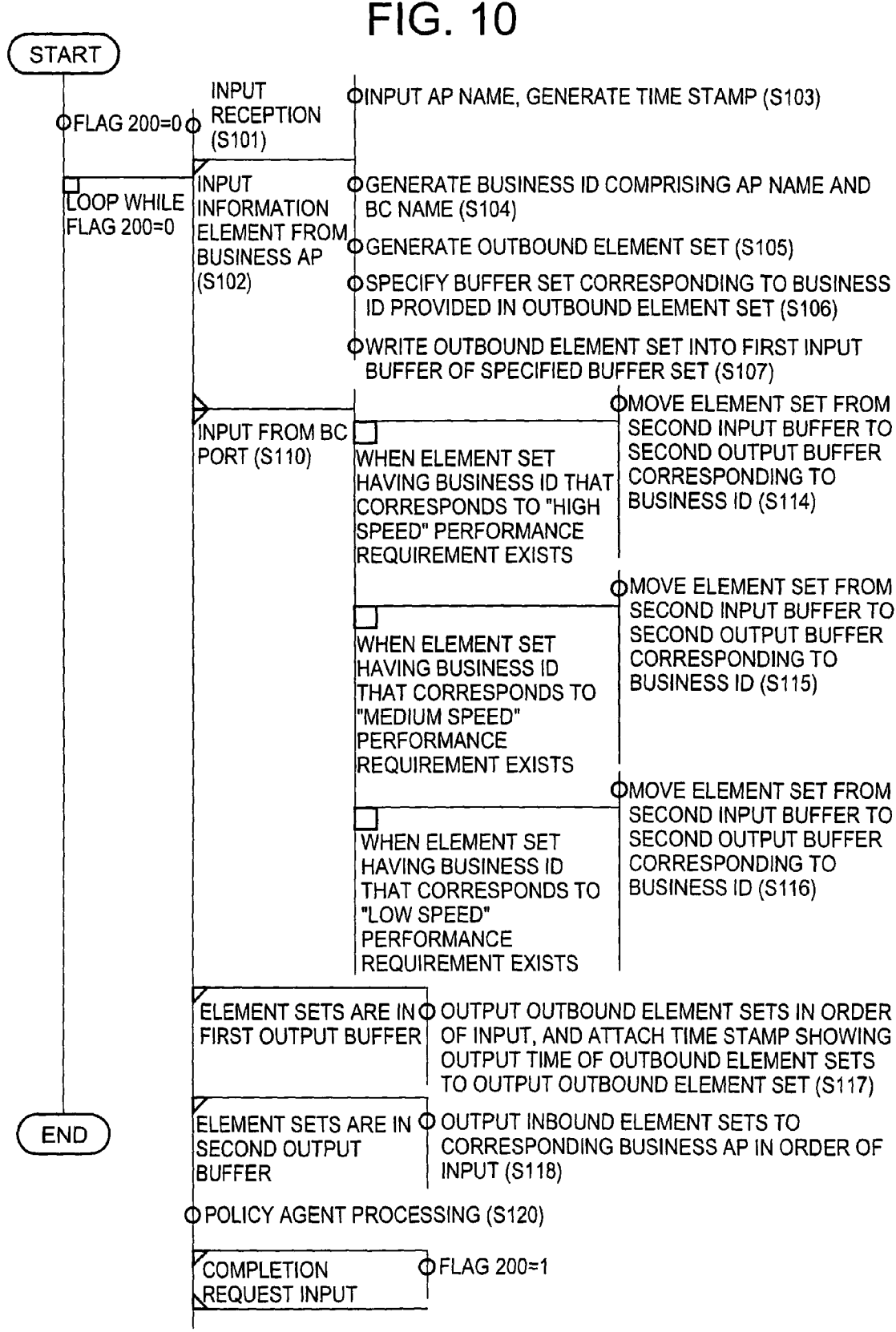
FIG. 10 shows an example of the flow of processing performed in a storage management processing portion 25 of a business computer 17B.

FIG. 10 shows an example of the flow of the processing performed in the storage management processing portion 25 of the business computer 17B.

The storage management processing portion 25 receives input of an information element from each of the business APs 4A to 4D (step S101). Input of the information element may signify that an information element of a size that can be set in the element set 980 is received from the business APs 4A to 4D, or that information is received, and the information is divided into a plurality of information elements.

When an information element is input from the business AP 4A (S102), for example, the storage management processing portion 25 inputs the AP name of the business AP 4A that called the API 828 thereof from the business AP 4A, and generates a time stamp showing the input time of the information element (S103).

Further, the storage management processing portion 25 generates a business ID comprising the AP name input in S103 and the BC name of the business computer 17B in which the storage management processing portion 25 itself is provided (S104).

The storage management processing portion 25 generates the element set ID, and then generates an outbound element set comprising the element set ID, the information element input in S102, the time stamp generated in S103, and the business ID generated in S104 (S105). At this time, the storage management processing portion 25 may receive a file name from the business AP 4A, for example, then specify the VOL name from the file name and specify the SC name, access source port name, and so on corresponding to the VOL name from the management information 703 (see FIG. 8B). Thus the storage management processing portion 25 is able to write the corresponding VOL name, and the specified SC name, access source port name, and so on into the header field 981 of the outbound element set.

Referring to the buffer management table 425, for example, the storage management processing portion 25 specifies the buffer set corresponding to the business ID included in the generated outbound element set (S106), and then writes the outbound element set generated in S105 into the first input buffer of the specified buffer set 44 (S107).

When an inbound element set is input from the BC port 600B, the storage management processing portion 25 writes the input inbound element set into the second input buffer 453A. Then, the storage management processing portion 25 specifies the performance requirement corresponding to the business ID of the inbound element set from the BC information elements 86R stored in the business computer 17B for each inbound element set stored in the second input buffer 453A. The storage management processing portion 25 moves the inbound element set with the highest performance requirement preferentially from the second input buffer 453A to the first output buffer. In other words, the storage management processing portion 25 moves the inbound element set with the highest performance requirement to the first output buffer first.

More specifically, for example, when an inbound element set having a business ID which corresponds to the "high speed" performance requirement exists in the second input buffer 453A, the storage management processing portion 25 moves the inbound element set from the second input buffer 453A to the second output buffer of the buffer set 44 corresponding to the business ID of the inbound element set (S114). Then, if an inbound element set having a business ID which corresponds to the "medium speed" performance requirement exists in the second input buffer 453A, the storage management processing portion 25 may move the inbound element set from the second input buffer 453A to the second output buffer of the buffer set 44 corresponding to the business ID of the inbound element set (S115). Then, if an inbound element set having a business ID which corresponds to the "low speed" performance requirement exists in the second input buffer 453A, the storage management processing portion 25 may move the inbound element set from the second input buffer 453A to the second output buffer of the buffer set 44 corresponding to the business ID of the inbound element set (S116).

When outbound element sets exist in the first output buffer 453B, the storage management processing portion 25 may output the outbound element sets to the BC port 600B in order of input, and at this time, a time stamp showing the output time of the outbound element set may be included in the output outbound element set (S117). Alternatively, for example, output from the first output buffer 453B to the BC port 600B may be performed in order of performance requirement, similarly to output from the second input buffer 453A to the second output buffers 44AB. The output outbound element set is transmitted to the storage control device 27 having the SC name written in the header field 981 of the outbound element set.

When inbound element sets exist in the second output buffer 44AB, the storage management processing portion 25 may output the inbound element sets to the corresponding business AP 4A in order of input (S118).

The storage management processing portion 25 may then activate the processing of the policy agent processing portion 424 (S120).

By setting a flag 200 to "1", the storage management processing portion 25 may drop out of the loop which begins when the flag 200 is set to "0".

Figure 11:
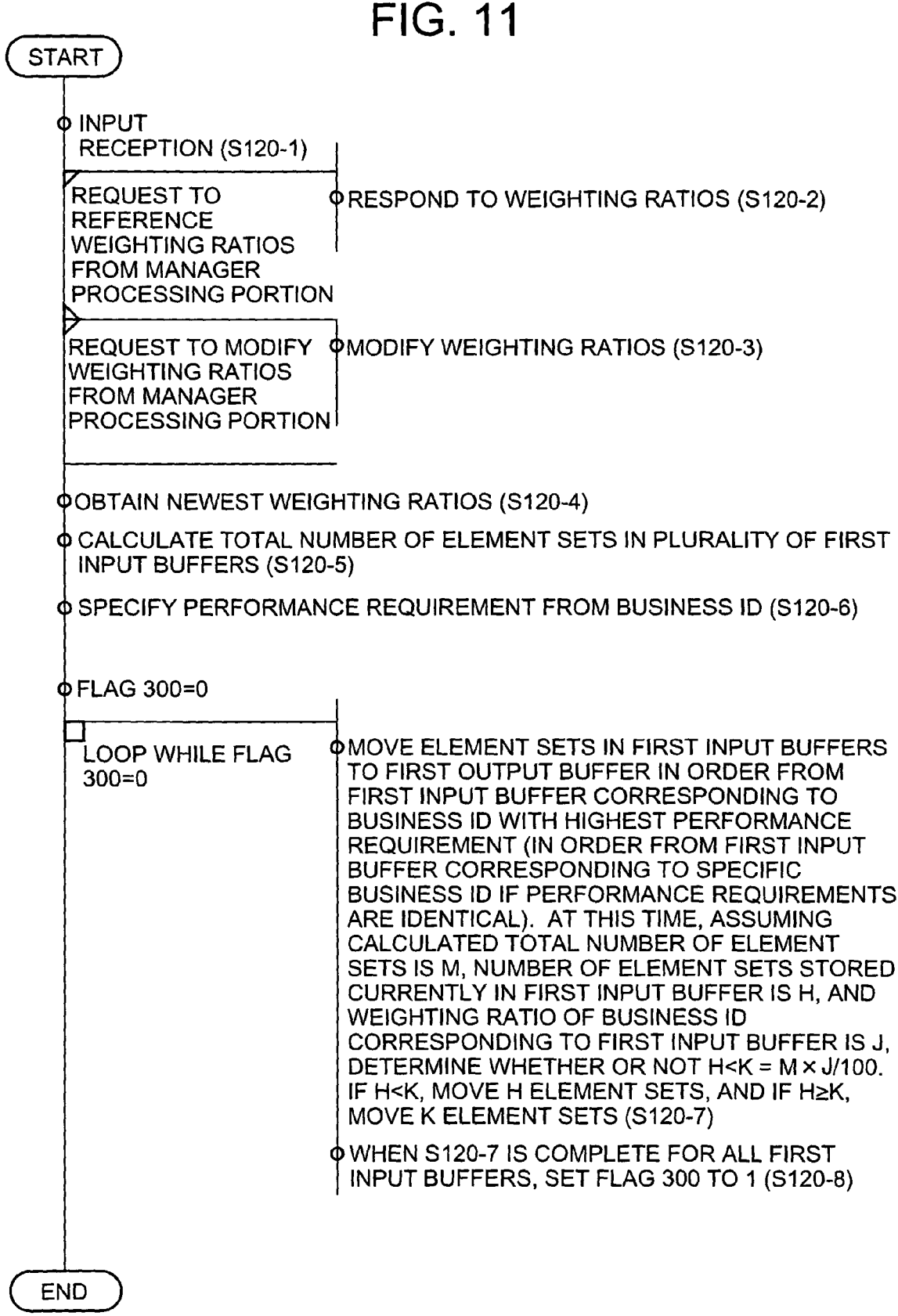
FIG. 11 shows an example of the flow of processing performed by a policy agent processing portion 424.

FIG. 11 shows an example of the flow of the processing performed by the policy agent processing portion 424.

The policy agent processing portion 424 receives input (S120-1).

Upon reception of a request from the manager processing portion 7 to check the weighting ratios, the policy agent processing portion 424 is able to transmit the buffer management table 425 to the manager processing portion 7 in response (S120-2).

Upon reception of a request from the manager processing portion 7 to modify the weighting ratios, the policy agent processing portion 424 is able to modify the weighting ratios of the business IDs specified by the manager processing portion 7 to the weighting ratios specified by the manager processing portion 7 (S120-3).

The policy agent processing portion 424 refers to the buffer management table 425, and obtains the newest weighting ratios of each business ID (each buffer set) (S120-4). This process is executed periodically, for example.

Following S120-4, the policy agent processing portion 424 calculates the total number of element sets in all of the first input buffers (S120-5). The policy agent processing portion 424 also obtains the performance requirement of each business ID from the BC information elements 86R (S120-6). Then, the policy agent processing portion 424 sets a flag 300 to zero, and performs S120-7 as described below.

The policy agent processing portion 424 moves the element sets in the first input buffers to the first output buffer 453B in order from the first input buffer corresponding to the business ID having the highest performance requirement (i.e. "high-speed) (when the performance requirement is the same, the elements sets are moved in order from the first input buffer corresponding to a specific business ID (for example, the business ID with the smallest number)). At this time, assuming the calculated total number of element sets is M, the number of element sets stored currently in the first input buffer undergoing the processing is H, and the weighting ratio of the business ID corresponding to the first input buffer is J, the policy agent processing portion 424 determines whether or not $H<K=M\times J/100$. If $H<K$, the policy agent processing portion 424 moves H element sets from the first input buffer undergoing the processing to the first output buffer 453B, and if $H \geq K$, the policy agent processing portion 424 moves K element sets to the first output buffer 453B (S120-7). Here, the weighting ratio J preferably takes a steadily higher value as the performance requirement increases, and therefore the number of element sets moved to the first output buffer 453B increases steadily as the performance requirement of the business ID increases.

The policy agent processing portion 424 performs the processing of S120-7 for all of the first input buffers, sets the flag 300 to 1 (S120-8), and ends S120-7.

The storage management processing portion 25 transmits the element sets moved into the first output buffer 453B to the storage control device 27, via the BC port 600B, in the order in which the element sets were written into the first output buffer 453B, for example.

By means of the processing of S120-4 to S120-8 described above, element sets are output to the BC port 600B via the first output buffer 453B in order from the first input buffer with the highest performance requirement. Moreover, by means of the processing of S120-4 to S120-8, the number of element sets output per unit time increases as the performance requirement of the first input buffer increases.

The above processing performed on the basis of the weighting ratios (S120-7 in FIG. 11, for example) may be applied to output from an output buffer during inbound communication instead of, or in addition to, movement of the element sets from an input buffer to an output buffer during outbound communication. Thus, in an identical predetermined time period, the storage management processing portion 25 is able to output more element sets from the second output buffer corresponding to the business ID=AP1 to the business AP 4A than the number of element sets output from the second output buffer corresponding to the business ID=AP3 to the business AP 4C, for example. Note that this may also be applied to processing performed in the storage control device 27 to be described below.

Figure 12:
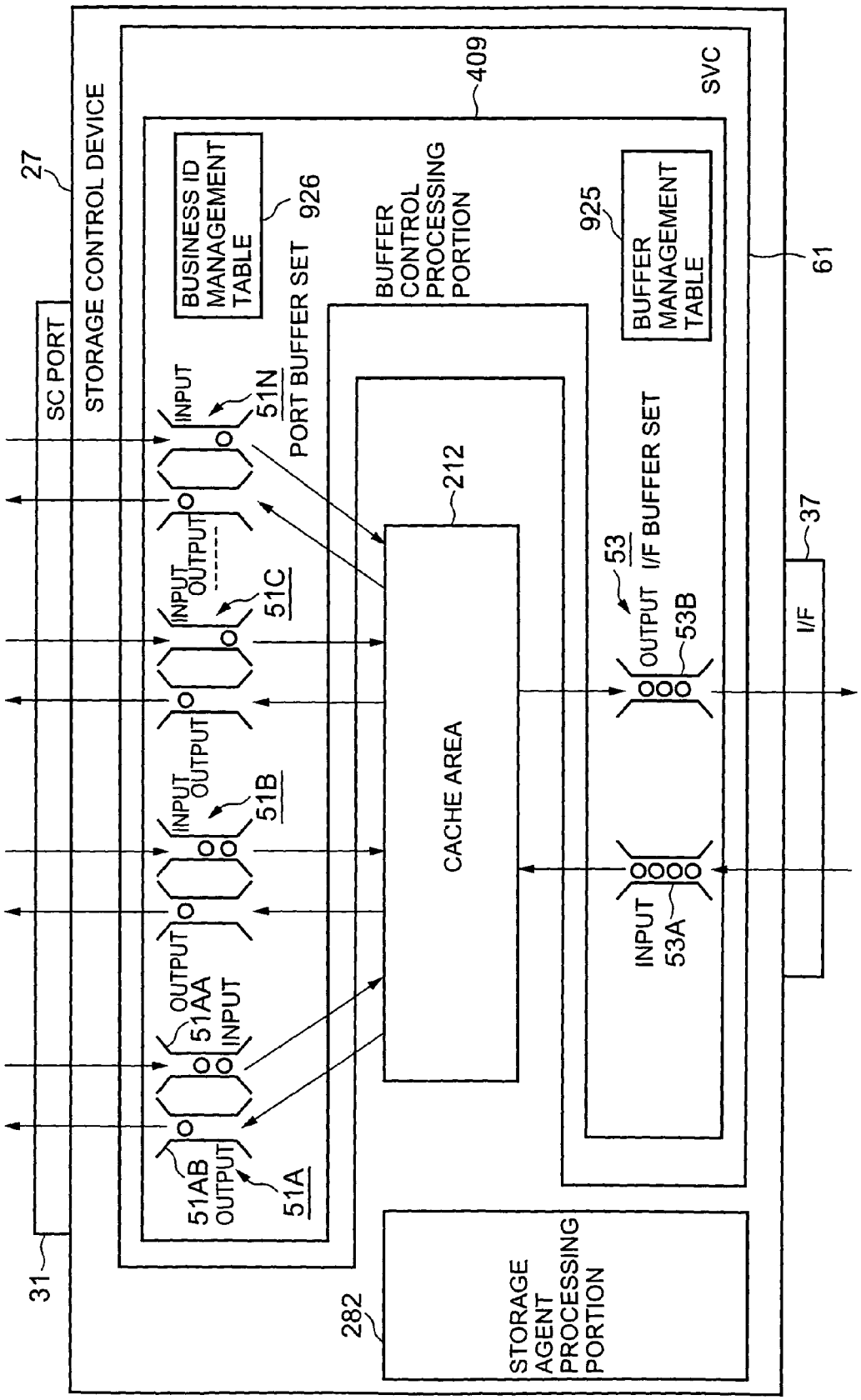
FIG. 12 is an illustrative view of measures taken in the storage control device 27 to perform processing in accordance with the performance requirement of the business AP.

FIG. 12 is an illustrative view of measures taken in the storage control device 27 to perform processing corresponding to the performance requirements of the business APs.

The storage control device 27 is constituted substantially identically to the business computer 17.

In other words, the storage control device 27 comprises the port buffer sets 51 serving as buffers for information input or output through the SC ports 31, and the I/F buffer sets 53 serving as buffers for information input or output through the I/Fs 37. The various buffer sets 51, 53 may be provided in a buffer area 208 in the memory 35.

One or a plurality of the port buffer sets 51 may be provided in a single storage control device 27, but the number of port buffer sets 51 provided in the information processing system according to this embodiment is equal to the number of buffer sets 44 provided in the information processing system. In other words, the port buffer set 51 is provided for each business ID, similarly to the buffer set 44. Taking a port buffer set 51A corresponding to the business ID "AP1" (i.e. the business AP 4A) as a representative example of the port buffer sets 51, the port buffer set 51A is constituted by a port input buffer 51AA in which outbound element sets are written, and a port output buffer 51AB in which inbound element sets are written.

The I/F buffer set 53 is constituted by an I/F output buffer 53B in which outbound element sets comprising information elements output through the I/F 37 are written, and an I/F input buffer 53A in which inbound element sets comprising information elements input through the I/F 37 are written.

Each port buffer set 51 and each I/F buffer set 53 is managed by the buffer control processing portion 409 of the SVC 61. The buffer control processing portion 409 may store a business ID management table 926 for managing the business IDs, and a buffer management table 925 for managing the weighting of each port buffer set 51, for example. As shown in the example in FIG. 13A, each business ID, the performance requirement corresponding to each business ID, and detached data, to be described below, are recorded in the business ID management table 926. As shown in the example in FIG. 13B, each business ID, the name of the port buffer set 51 corresponding to each business ID, and the weighting ratio of each port buffer set 51 are recorded in the buffer management table 925. The weighting ratios of the port buffer sets 51 are set such that the sum total of the weighting ratios of the one or plurality of port buffer sets 51 provided in the storage control device 27 equals 100.

Returning the FIG. 12, the buffer control processing portion 409 is capable of performing similar processing to the storage management processing portion 25.

For example, the buffer control processing portion 409 is capable of moving element sets to the I/F output buffer 53B from the port input buffer with the highest performance requirement onward. Further, for example, the buffer control processing portion 409 is capable of moving the one or more element sets stored in the I/F input buffer 53A to the port input buffer in order from the element set with the highest performance requirement. When moving element sets from the port input buffer to the I/F output buffer, and when moving element sets from the I/F input buffer to the port output buffer, the buffer control processing portion 409 can move the element sets via the cache area 212.

The buffer control processing portion 409 is also capable of writing the information element contained in an outbound element set output from the I/F output buffer into the VOL 41 via the I/F 37. Further, the buffer control processing portion 409 is capable of generating an inbound element set containing an information element input from the VOL 41 via the I/F 37, and writing this element set into the I/F input buffer 53A. Note that during this processing, the buffer control processing portion 409 is capable of detaching data other than the information element from the outbound element set, and recording these detached data in the business ID management table 926 (specifically, in the row corresponding to the business ID provided in the detached data, for example) as the aforementioned "detached data". Then, when an information element (inbound information element hereafter) corresponding to the information element (outbound information element hereafter) in the outbound element set is returned to the transmission source of the outbound information element, the buffer control processing portion 409 is able to obtain the "detached data" corresponding to the outbound information element from the business ID management table 926, generate an inbound element set comprising the obtained data and the inbound information element, and write the inbound element set into the I/F input buffer 53A. In so doing, inbound element sets corresponding to outbound element sets can be transmitted to a business computer. Note that data detachment may be performed before the outbound information element is written from the port input buffer into the cache area 212. Further, incorporation of the "detached data" into an element set may be performed when the inbound information element is written from the cache area 212 into the port output buffer, or when the inbound information element is output from the port output buffer.

FIG. 14 shows the flow of the processing performed in the information processing system. In the following description, it is assumed, for ease of understanding, that a single inbound element set is returned in relation to each outbound element set.

In the first embodiment, a plurality of time lengths is measured in order to perform processing corresponding to the performance requirement of the business AP, and response processing is performed by at least one of the storage management processing portion 25, buffer control processing portion 409, and manager processing portion 7 to shorten each measured time length.

The storage management processing portion 25 generates a time stamp (input time stamp hereafter) showing a time t0 at which an information element is received from the business AP 4, and transmits an outbound element set comprising the input time stamp to the storage control device 27 via the SAN 19. At this time, the storage management processing portion 25 generates a time stamp (output time stamp hereafter) showing a time t1 at which the output outbound element set is output, and includes the output time stamp in the outbound element set transmitted to the storage control device 27. The storage management processing portion 25 is able to associate the times t0 and t1 with the element set ID and business ID of the transmitted element set, and store these elements in a predetermined storage area of the business computer 17.

Upon reception of the outbound element set, the buffer control processing portion 409 in the SVC 61 of the storage control device 27 is able to learn a time t2 at which the outbound element set is received. The buffer control processing portion 409 can also learn a time t3 at which the VOL 41 is accessed on the basis of the information element in the outbound element set. Further, the buffer control processing portion 409 can learn a time t4 at which the result of this access (for example, a writing completion response or the information element read in response to a read request) is received. The buffer control processing portion 409 can also learn a time t5 at which an inbound element set corresponding to the received outbound element set is output. The buffer control processing portion 409 is then able to generate the inbound element set comprising another input time stamp showing the time t5, and the business ID and element set ID contained in the received outbound element set, and transmit this inbound element set to the business computer 17 that is the transmission source of the outbound element set. The buffer control processing portion 409 is then capable of associating the times t2, t3, t4, and t5 with the element set ID and business set ID of the inbound element set, and storing these elements in a predetermined storage area (for example, the control information area 206 of the memory 35) of the storage control device 27. Further, the buffer control processing portion 409 is capable of transmitting a set of the stored element set ID, business ID, and times t2, t3, t4, t5 to the manager processing portion 7 either actively or in response to a request from the manager processing portion 7.

When the inbound element set corresponding to the outbound element set transmitted by the storage management processing portion 25 is received, the storage management processing portion 25 can learn a time t6 at which the inbound element set is received, and can store the element set ID and business ID provided in the inbound element set together with the time t6 in a predetermined storage area. Further, the storage management processing portion 25 writes the received inbound element set into the second input buffer 453A, moves the inbound element set into the second output buffer 44AB corresponding to the business ID provided in the inbound element set, and outputs the information element in the inbound element set from the second output buffer 44AB to the corresponding business AP4. In so doing, the storage management processing portion 25 can learn a time t7 of this output, and store the time t7 in the aforementioned predetermined storage area in association with the element set ID and business ID. The storage management processing portion 25 can then transmit a set of the stored element set ID, business ID, and times t0, t1, t6, and t7 to the manager processing portion 7 either actively or in response to a request from the manager processing portion 7.

The manager processing portion 7 is capable of receiving the set of the element set ID, business ID, and times t0, t1, t6, t7 from the storage management processing portion 25, and storing this set in a predetermined storage area of the management computer 5 (or an external storage). The manager processing portion 7 is also capable of receiving the set of the element set ID, business ID, and times t2, t3, t4, t5 from the buffer control processing portion 409, and storing this set in a predetermined storage area. On the basis of the stored times t0, t1, t2, t3, t4, t5, t6, and t7, the manager processing portion 7 can calculate a plurality of time lengths. Examples of the calculated time lengths include: (1) a response time length, which is calculated from t7−t0; (2) a first outbound processing time length calculated from t1−t0; (3) an outbound communication time length calculated from t2−t1; (4) a second outbound processing time length calculated from t3−t2; (5) an IO processing time length calculated from t4−t3; (6) a first inbound processing time length calculated from t5−t4; (7) an inbound communication time length calculated from t6−t5; (8) a second inbound processing time length calculated from t7−t6; (9) an outbound time length calculated from t3−t0; and (10) an inbound time length calculated from t7−t4. As shown in the example in FIG. 15A, the manager processing portion 7 prepares a time length table 940 for each set of the element set ID and business ID, and records the calculated time lengths (1) to (10) (hereafter, the calculated time lengths will occasionally be referred to as "measured time length values") in each time length table 940. Then, referring to the policy information 13, the manager processing portion 7 is able to cause the storage management processing portion 25, buffer control processing portion 409, or SAN control computer 21 to execute response processing to shorten at least one of the calculated time lengths (1) to (10).

Specifically, for example, a response processing table 1013 for each business ID is included in the policy information 13, as shown in the example in FIG. 15B. Information indicating which measured time length value activates which the response processing in which case is recorded in each response processing table 1013 corresponding to each business ID. More specifically, for example, the business ID=AP1 corresponds to the "high speed" performance requirement, and hence in the response processing table 1013 corresponding to the business ID=AP1, response processing that is executed to shorten each measured time length value is recorded. Even more specifically, for example, when the measured value of the outbound time length (t3−t0) is larger than a predetermined threshold A1 and/or the difference between the measured value of the outbound time length and the measured value of the inbound communication length (t7−t4) is larger than a certain constant S, information is recorded in the response processing table 1013 indicating that at least one of the following types of response processing (A-1) to (A-4) is to be performed as response processing to shorten the measured value of the outbound time length.

(A-1) Increase the resources and reading speed of the port input buffer (and/or first input buffer) corresponding to the business ID=AP1 (and reduce the resources and reading speed of the port input buffer (and/or first input buffer) corresponding to the business ID=AP3, which has a lower performance requirement than the business ID=AP1).

(A-2) Increase the SAN communication speed.

(A-3) Increase the weighting ratio of the first input buffer (and/or port input buffer) corresponding to the business ID=AP1 (and reduce the weighting ratio of the first input buffer (and/or port input buffer) corresponding to the business ID=AP3, which has a lower performance requirement than the business ID=AP1).

(A-4) Increase the storage capacity of one cache sub-area (and reduce the storage capacity of another cache sub-area).

Note that these examples focus on the outbound time length, but may also be applied to the inbound time length. More specifically, when the measured value of the inbound time length is larger than a predetermined threshold A2 and/or the difference between the measured value of the inbound time length and the measured value of the outbound communication length is larger than a certain constant S2, information indicating that at least one of the types of response processing (A-1) to (A-4) is to be performed as response processing to shorten the measured value of the inbound time length may be recorded in the response processing table 1013 corresponding to the business ID=AP1. At this time, the content of (A-1) and (A-3) may be modified to reflect inbound communication, for example. In other words, the subject buffers in (A-1), for example, may be modified to the buffers (the port output buffer and second input buffer, for example) on the inbound communication path.

Further, although not illustrated in the drawing, the following types of response processing (a) to (c), for example, may be recorded in the response processing table 1013 corresponding to the business ID=AP1.

(a) When the measured value of the first outbound processing time length is larger than a predetermined threshold A3 and/or the difference between the measured value of the first outbound processing time length and the measured value of the second inbound processing time length is larger than a certain constant S3, the response processing (A-1) and/or (A-3) are to be performed. Note that in (A-1) and (A-3), the subject buffer may be set as the first input buffer.

(b) When the measured value of the outbound communication time length is larger than a predetermined threshold A4 and/or the difference between the measured value of the outbound communication time length and the measured value of the inbound communication time length is larger than a certain constant S4, the response processing (A-2) is to be performed.

(c) When the measured value of the second outbound processing time length is larger than a predetermined threshold A5 and/or the difference between the measured value of the second outbound processing time length and the measured value of the first inbound processing time length is larger than a certain constant S5, the response processing (A-1) and/or (A-3) are to be performed. Note that in (A-1) and (A-3), the subject buffer may be set as the port input buffer.

Similarly to the above description of response processing relating to the outbound time length, the processing types (a) to (c) focus on outbound communication, but may be applied to inbound communication.

Figure 16A:
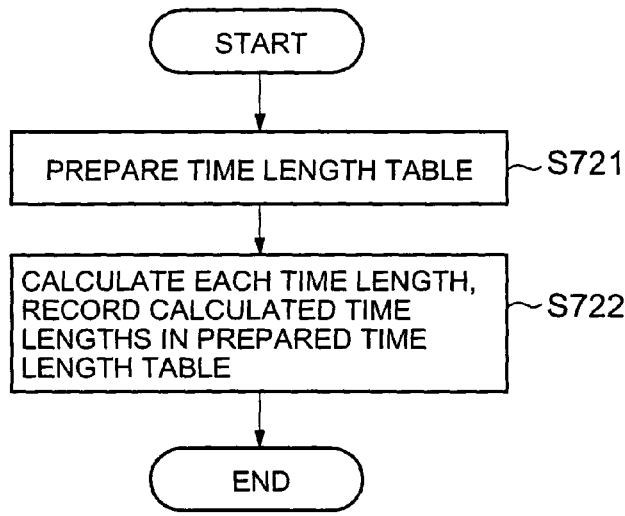
FIG. 16A shows an example of the flow of processing performed by a manager processing portion 7.
Figure 16B:
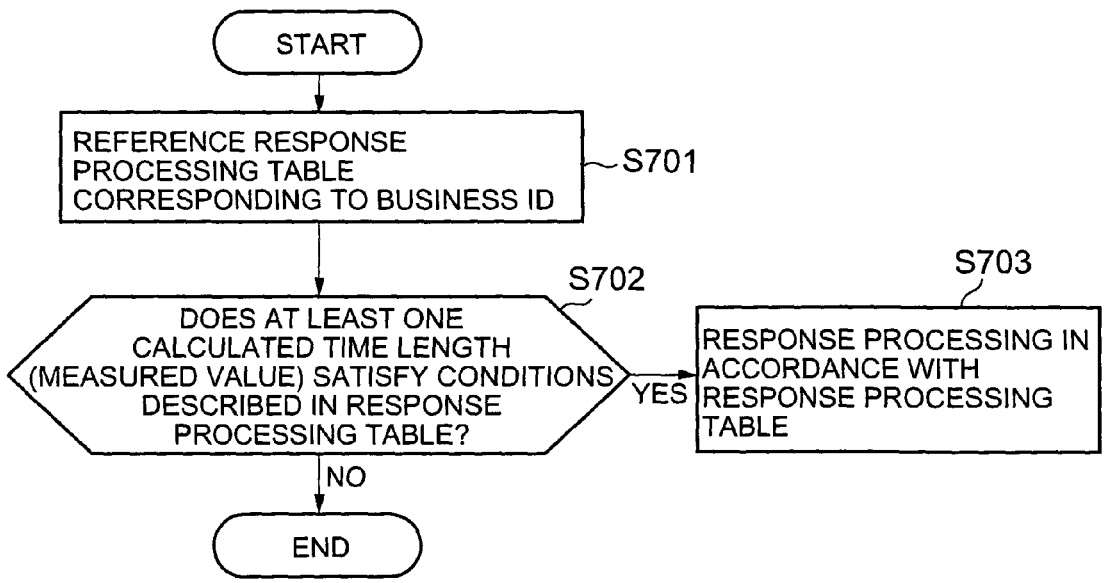
FIG. 16B shows another example of the flow of the processing performed by the manager processing portion 7.

The manager processing portion 7 is capable of executing the processing shown in the example in FIG. 16A and the processing shown in the example in FIG. 16B periodically, or whenever a new set of the element set ID, business ID, and times t0 to t7 is obtained. As shown in the example in FIG. 16A, the manager processing portion 7 can prepare the time length table 940 (S721), calculate each time length, and record the calculated time lengths in the time length table 940 prepared in S721 (S722). As shown in the example in FIG. 16B, the manager processing portion 7 can refer to the response processing table 1013 corresponding to an arbitrary business ID stored in the predetermined storage area (S701), and determine whether or not at least one time length satisfies the conditions recorded in the referenced response processing table 1013 (S702). If so (YES in S702), the manager processing portion 7 can execute processing based on the response processing table 1013 (S703). When the referenced response processing table 1013 is the response processing table 1013 corresponding to the business ID=AP1, for example, the manager processing portion 7 is capable of executing the following processing.

For example, the manager processing portion 7 can determine whether or not the measured value of the outbound time length is greater than the threshold A1, and if so, the manager processing portion 7 can execute processing in accordance with the response processing table 1013. Further, the manager processing portion 7 can determine whether or not the difference between the measured value of the outbound time length and the measured value of the inbound time length is greater than the constant S, and if so, the manager processing portion 7 can execute processing in accordance with the response processing table 1013.

When executing the response processing (A-1), for example, the manager processing portion 7 can transmit a command to the buffer control processing portion 409 (and/or the storage management processing portion 25) to increase the resources of the port input buffer (and/or first input buffer) corresponding to the business ID=AP1 by a predetermined amount and increase the reading speed at which the element sets are read from the port input buffer (and/or first input buffer) (i.e. the speed at which element sets are output from the port input buffer and/or first input buffer) by a predetermined amount. In addition, the manager processing portion 7 can transmit a command to the buffer control processing portion 409 (and/or the storage management processing portion 25) to reduce the resources and reading speed of the port input buffer (and/or first input buffer) of a business ID corresponding to the "low speed" or "medium speed" performance requirements such as the business ID=AP3, for example, by an amount corresponding to the above amount of increase. As a result, the buffer control processing portion 409 (and/or storage management processing portion 25), upon reception of these commands, can increase the resources and reading speed of the port input buffer (and/or first input buffer) corresponding to the business ID=AP1 by the commanded amount, and reduce the resources and reading speed of another port input buffer (and/or first input buffer) by an amount corresponding to the amount of increase.

Further, when executing the response processing (A-2), for example, the manager processing portion 7 can transmit a command to the SAN control computer 21 to increase the communication speed between the business computer 17 comprising the business AP having the business ID=AP1, and the storage control device 27 serving as the transmission source of the business ID=AP1. Thus, having received the command, the SAN control computer 21 can raise the communication speed between the business computer 17 and storage control device 27 by a method such as modifying the routing between the business computer 17 and storage control device 27 or increasing the band between the business computer 17 and storage control device 27.

When executing the response processing (A-3), for example, the manager processing portion 7 can transmit a command to the storage management processing portion 25 (and/or the buffer control processing portion 409) to increase the weighting ratio corresponding to the business ID=AP1 by a predetermined value (10%, for example). In addition, the manager processing portion 7 can transmit a command to the storage management processing portion 25 (and/or the buffer control processing portion 409) to reduce the weighting ratio corresponding to a business ID corresponding to the "low speed" or "medium speed" performance requirements, such as the business ID=AP3, by an amount corresponding to the above amount of increase (10%, for example). As a result, the storage management processing portion 25 (and/or the buffer control processing portion 409), upon reception of these commands, can update the buffer management table 425 (and/or the buffer management table 925) by increasing the weighting ratio corresponding to the business ID=AP1 by the predetermined value, and reducing another weighting ratio by the predetermined value.

Further, when executing the response processing (A-4), for example, the manager processing portion 7 can transmit a command to the storage control device 27 to increase the storage capacity of the cache sub-area corresponding to the "high speed" performance requirement of the business ID=AP1 by a predetermined amount. In addition, the manager processing portion 7 can transmit a command to the storage control device 27 to reduce the storage capacity of a cache sub-area corresponding to the "medium speed" or "low speed" performance requirements, which are lower than the "high speed" performance requirement.

Figure 17A:
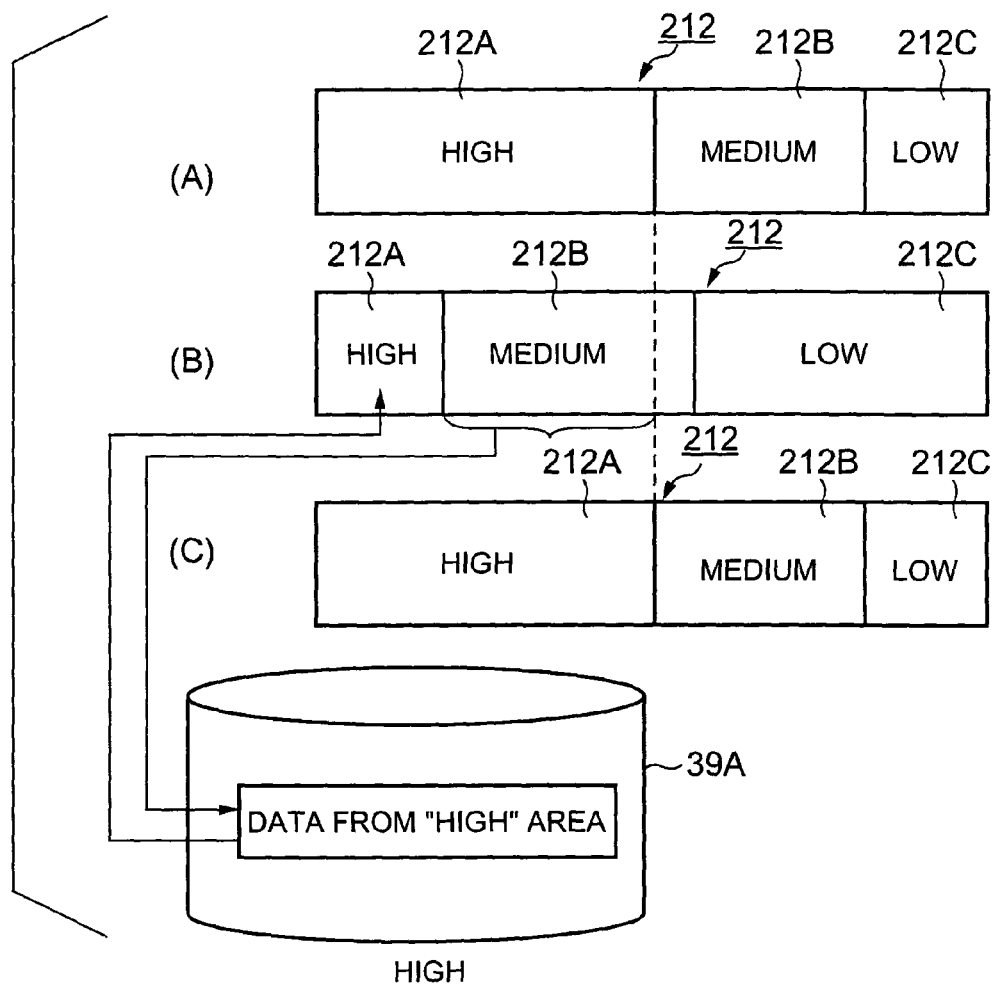
FIG. 17A is an illustrative view relating to modification of the storage capacity of a cache sub-area.

FIG. 17A is an illustrative view relating to modification of the storage capacity of the cache sub-area.

As shown in (A), for example, the cache area 212 comprises a cache sub-area (high speed sub-area hereafter) 212A corresponding to the "high speed" performance requirement, a cache sub-area (medium speed sub-area hereafter) 212B corresponding to the "medium speed" performance requirement, a cache sub-area (low speed sub-area hereafter) 212C corresponding to the "low speed" performance requirement. When moving an outbound element set comprising a business ID which corresponds to the "high speed" performance requirement to the I/F output buffer 53B, for example, the buffer control processing portion 409 is able to secure a certain location (known as a "cache hit") in the high-speed sub-area 212A, and move the out bound element set comprising the business ID which corresponds to the "high speed" performance requirement to the I/F output buffer 53B via this secured location. Hence, as the storage capacity of the high speed sub-area 212A increases, the success rate of the cache hit (cache hit rate hereafter) increases, and conversely, as the storage capacity of the high speed sub-area 212A decreases, the cache hit rate decreases. Therefore, by increasing the storage capacity of the high speed sub-area 212A, the cache hit rate for an element set comprising a business ID which corresponds to the "high speed" performance requirement can be increased, and accordingly, the processing speed of the information elements output as a result of execution of the business AP having the business ID which corresponds to the "high speed" performance element can be increased.

In accordance with a command from the manager processing portion 7, for example, the storage control device 27 is capable of reducing the storage capacity of the high speed sub-area 212A and increasing the respective storage capacities of the medium speed sub-area 212B and low speed sub-area 212C from the state shown in (A) to the state shown in (B), and is also capable of reducing the respective storage capacities of the medium speed sub-area 212B and low speed sub-area 212C and increasing the storage capacity of the high speed sub-area 212A from the state shown in (B) to the state shown in (C).

When reducing the storage capacity of the high speed sub-area 212A from (A) to (B), for example, the storage control device 27 is able to hold the data that were stored in the eliminated part of the high speed sub-area 212A temporarily in the storage 39, and when (as soon as, for example) space becomes available in the high speed sub-area 212A following elimination of the data in the high speed sub-area 212A after the storage capacity thereof is reduced, the storage control device 27 is able to read the data held in the storage 39 into the high speed sub-area 212A having the reduced storage capacity, and process these data. A storage corresponding to the performance requirement of the holding source sub-area may be set as the holding destination storage 39 (for example, when the holding source is the high speed sub-area 212A, the holding destination is the high speed storage 39A). This also applies to the sub-areas of the other performance requirements.

The manager processing portion 7 is able to perform processing such as that described above. Note that an order of precedence may be set for the four types of response processing (A-1) to (A-4). For example, when the outbound time length is not shortened after the response processing having the highest order of precedence is performed, the manager processing portion 7 may execute the response processing having the next highest order of precedence. Further, the manager processing portion 7 may execute at least one of the four types of response processing (A-1) to (A-4) described above on the basis of the response processing table 1013 and at least one of the first outbound processing time length, outbound communication time length, second outbound processing time length, first inbound processing time length, inbound communication time length, and second inbound processing time length, which are more segmented than the outbound time length and inbound time length.

Figure 17B:
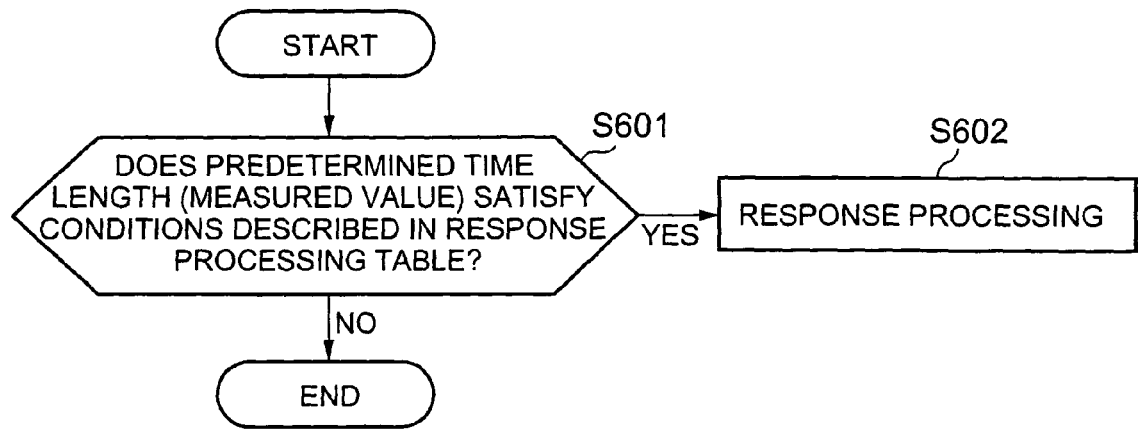
FIG. 17B shows an example of the flow of processing performed by a buffer management control portion 409.

Further, the response processing to shorten the outbound time length may be performed by the buffer control processing portion 409 or storage management processing portion 25 without receiving a command from the manager processing portion 7. For example, as shown in FIG. 17B, the buffer control processing portion 409 or storage management processing portion 25 may calculate a predetermined time length from among the one or more calculable time lengths, determine whether or not the calculated time length satisfies specific conditions (the conditions described in the response processing table, for example) (S601), and if so, execute the predetermined response processing (S602). More specifically, for example, the buffer control processing portion 409 may calculate the outbound time length from the time t0 indicating the time stamp in the received outbound element set and the time t3 at which the storage is accessed, determine whether or not the calculated outbound time length is greater than a threshold corresponding to the performance requirement of the business ID in the received outbound element set, and if so, execute the response processing (A-1), (A-3), and/or (A-4) described above.

According to the first embodiment described above, the processing speed of an information element output as a result of execution of a business AP is controlled on the basis of the business ID of the business AP. For example, the length of time that an information element output as a result of execution of a business AP having a business ID with the "high speed" performance requirement remains in the business computer 17 may be reduced below the length of time an information element output as a result of execution of a business AP having a business ID with another performance requirement, such as "medium speed" or "low speed", remains in the business computer 17. Further, for example, the length of time required for an information element output as a result of execution of a business AP having a business ID with the "high speed" performance requirement to reach the storage control device 27 may be reduced below the length of time required for an information element output as a result of execution of a business AP having a business ID with another performance requirement, such as "medium speed" or "low speed", to reach the storage control device 27. Further, for example, the length of time that an information element output as a result of execution of a business AP having a business ID with the "high speed" performance requirement remains in the storage control device 27 may be reduced below the length of time an information element output as a result of execution of a business AP having a business ID with another performance requirement, such as "medium speed" or "low speed", remains in the storage control device 27. Thus processing can be performed in accordance with the performance requirement of the business AP.

Also according to the first embodiment, various time lengths segmented from the response time length (t7−t0) may be calculated, and on the basis of these segmented time lengths, it is possible to specify the location of the processing that is causing a bottleneck in the response time length. Response processing is performed on the basis of the specified result to eliminate the bottleneck, and hence the overall response time length can be shortened. This processing may be performed on the basis of the performance requirement.

Second Embodiment

A second embodiment of the present invention will now be described. Note that the following description focuses on the differences between the first and second embodiments, and therefore similarities between the first and second embodiments have been omitted or simplified.

Figure 18A:
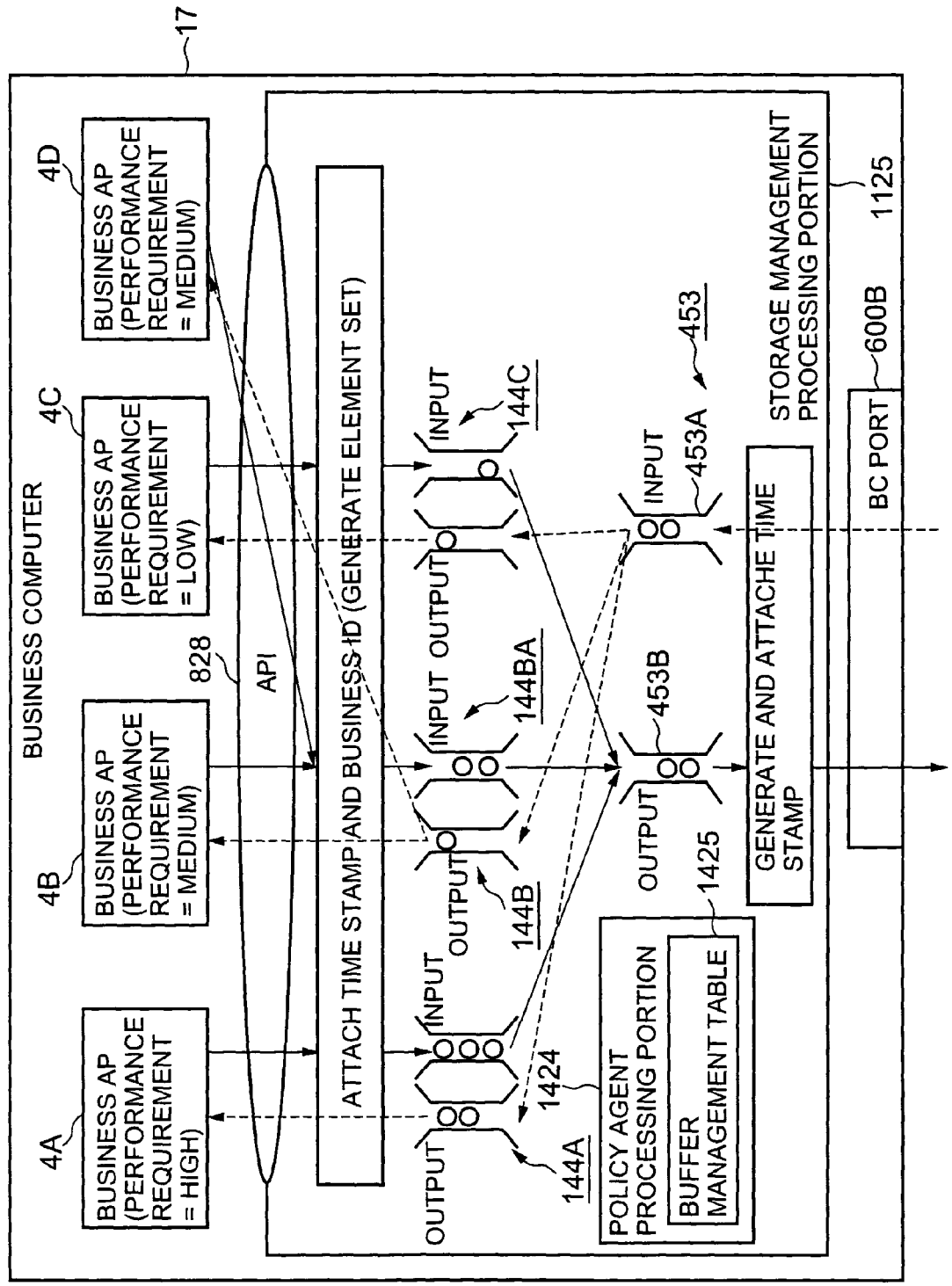
FIG. 18A is an illustrative view of measures taken in the business computer 17 to perform processing in accordance with the performance requirement of the business AP in a second embodiment of the present invention.

FIG. 18A is an illustrative view of measures taken in the business computer 17 to perform processing in accordance with the performance requirement of the business AP in the second embodiment of the present invention.

In the first embodiment, the buffer set is prepared for each business ID, but in the second embodiment, a buffer set 144 is prepared for each performance requirement. In other words, a buffer set 144A corresponding to the "high speed" performance requirement, a buffer set 144B corresponding to the "medium speed" performance requirement, and a buffer set 144C corresponding to the "low speed" performance requirement are prepared. Hence, outbound element sets comprising information elements output respectively from the business APs 4B and 4D, for example, both of which have the "medium speed" performance requirement, are all written into a first input buffer 144BA corresponding to the "medium speed" performance requirement.

The buffer set 144 is prepared for each performance requirement, and hence in a buffer management table 1425, the weighting ratio is set for each performance requirement, as shown in the example in FIG. 18B.

Figures 19A, 19B:
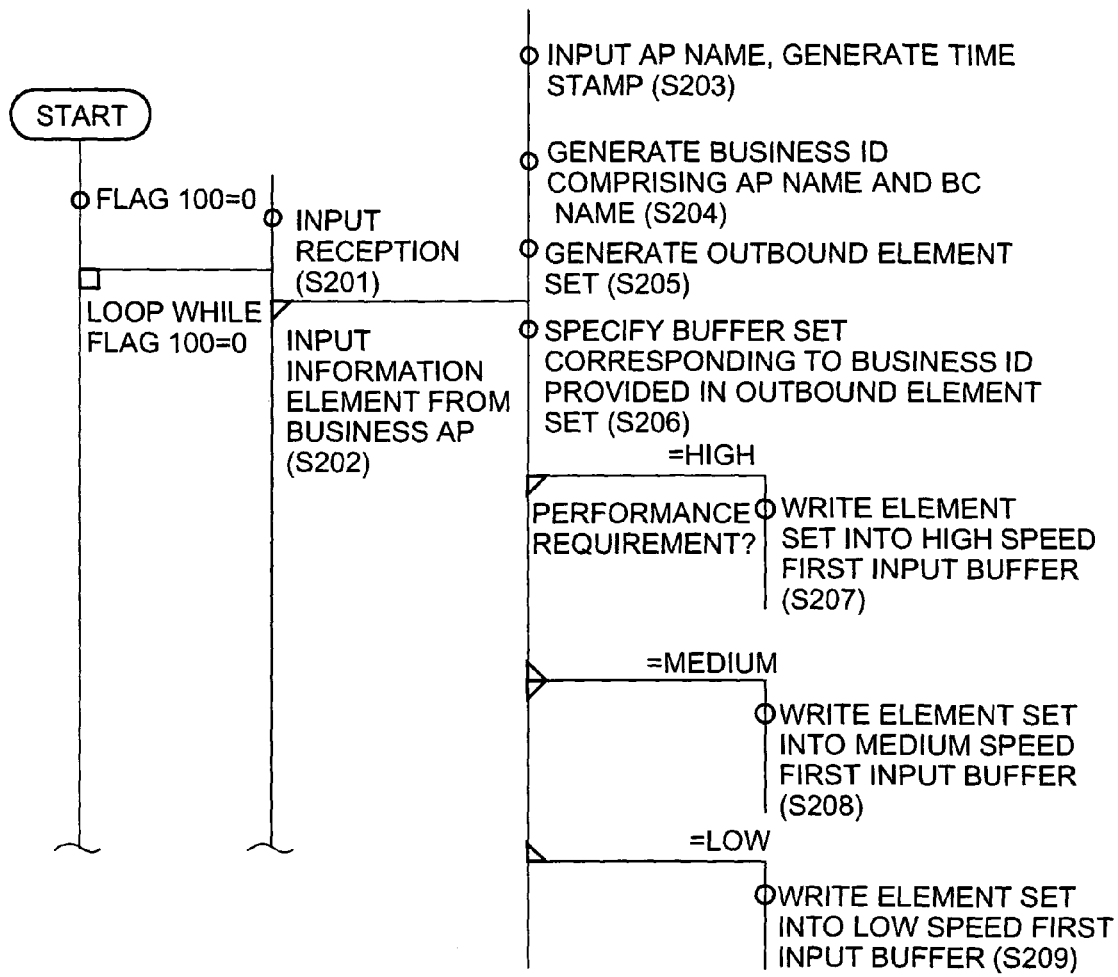
FIG. 19A shows a part of the flow of processing performed by a storage management processing portion 1125.
FIG. 19B is an illustrative view of S220-7, performed by a policy agent processing portion 1424.

As shown in the example in FIG. 19A, a storage management processing portion 1125 is able to generate an outbound element set by performing similar processing to that of S101 to S105 in FIG. 10 (S201 to S205). The storage management processing portion 1125 is then able to specify a performance requirement corresponding to the business ID in the generated outbound element set from the BC information elements 86R, specify a buffer set which matches the specified performance requirement from the buffer management table 1425, and write the outbound element set generated in S205 into the first input buffer of the specified buffer set (S207 to S209).

A policy agent processing portion 1424 in the storage management processing portion 1125 is capable of executing S220-7, shown in the example in FIG. 19B, in place of S120-7 in FIG. 11.

More specifically, the policy agent processing portion 1424 moves the element sets in the first input buffers to the first output buffer 453B in order from the first input buffer having the highest performance requirement (i.e. "high speed"). At this time, assuming that the total number of element sets in all of the first input buffers is M, the number of element sets stored currently in the first input buffer undergoing the processing is X, and the weighting ratio of the business ID corresponding to the first input buffer is P, the policy agent processing portion 1424 determines whether or not X<L=M× P/100. If X<L, the policy agent processing portion 1424 moves X element sets from the first input buffer undergoing the processing to the first output buffer 453B, and if X≧L, the policy agent processing portion 1424 moves L element sets to the first output buffer 453B (S220-7).

By means of this processing, more element sets are moved to the first output buffer 453B as the performance requirement of the first input buffer increases.

Figure 20A:
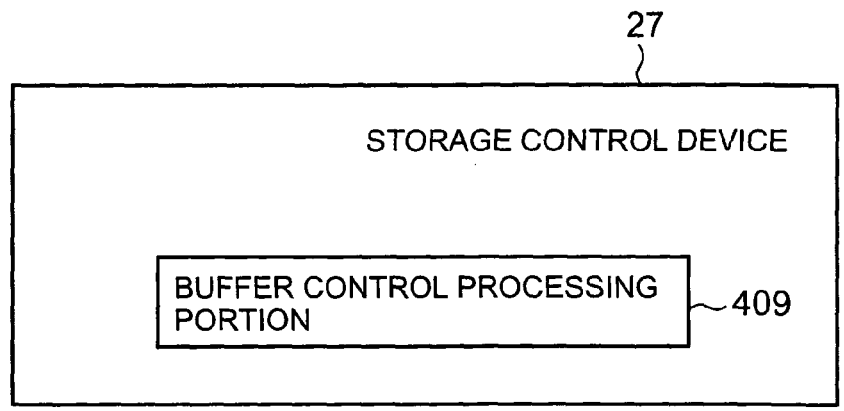
FIG. 20A is an illustrative view of a case in which a virtual computer 61 is not provided in the storage control device 27.

Note that in the second embodiment, as shown in the example in FIG. 20A, the storage virtual computer 61 need not be provided in the storage control device 27.

Figure 20B:
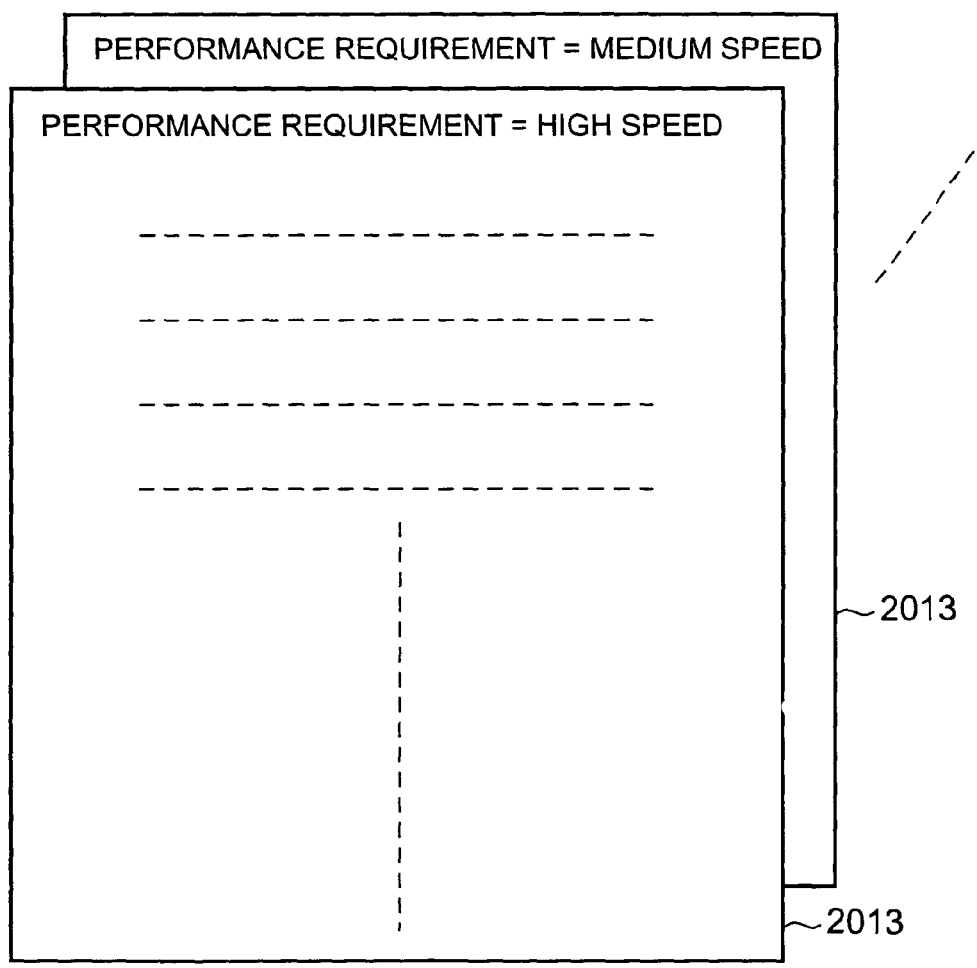
FIG. 20B is an illustrative view of a case in which a response processing table 2013 is prepared for each performance requirement.

Also in the second embodiment, as shown in the example in FIG. 20B, a response processing table 2013 is prepared for each performance requirement.

According to the second embodiment described above, the processing speed of information elements output as a result of execution of a business AP is controlled on the basis of the performance requirement of the business AP, and hence processing which matches the performance requirement of the business AP can be performed.

Third Embodiment

A third embodiment of the present invention will now be described.

FIG. 22 is an example of the cache area 212 in the third embodiment of the present invention.

In the third embodiment, an element set comprising an information element that is read frequently by the business AP 4 (for example, an information element that is read a predetermined number of times or more per minute) can be recorded in advance in each of the cache sub-areas 212A to 212C in accordance with the performance requirement of the business AP 4. Thus, since the read subject data already exist in the cache sub-areas, the storage control device 27 can provide the business AP with the data without accessing the storage 39, and as a result, the response time length during reading can be shortened.

Moreover, in the third embodiment the storage control device 27 is capable of reading data into the sub-area whose storage capacity is to be increased from the storage which corresponds to the performance requirement of this sub-area, and moving data from the sub-area whose storage capacity has been decreased to the storage which corresponds to the performance requirement of this sub-area.

For example, when reducing the storage capacity of the high speed sub-area 212A from (A) to (B), the storage control device 27 is able to hold the data that were stored in the eliminated part of the high speed sub-area 212A in the high speed storage 39A. Then, when increasing the storage capacity of the high speed sub-area 212A from (B) to (C), the storage control device 27 is able to return the data held in the storage 39A from the storage 39A to the new high speed sub-area 212A.

On the other hand, when increasing the low speed sub-area 212C* from (A) to (B), for example, the storage control device 27 is able to load data that are read frequently by the business AP 4C having the "low speed" performance requirement from the low speed storage 39C into the increased part of the low speed sub-area 212C. Then, when reducing the storage capacity of the low speed sub-area 212C from (B) to (C), the storage control device 27 is able to return the data to the storage 39C from the eliminated part of the low speed sub-area 212C.

This series of transitions from (A) to (C) may be performed automatically in accordance with the policy information 13. For example, in a first time period (from 9 am to 9 pm, for example), the storage control device 27 may set the state of the cache area 212 to (A) and (C), and in a second time period (from 9 pm to 9 am, for example), the storage control device 27 may set the state of the cache area 212 to (B).

Several embodiments of the present invention were described above, but these embodiments are merely examples provided to illustrate the present invention, and there is no intention to limit the scope of the present invention to these embodiments alone. The present invention may be implemented in various other embodiments.

For example, the performance requirement is not limited to the three levels "high speed", "medium speed", and "low speed", and may have more or fewer levels.

Further, for example, the element sets need not be stored in buffers, and may be stored in other types of storage area.

Figure 21A:
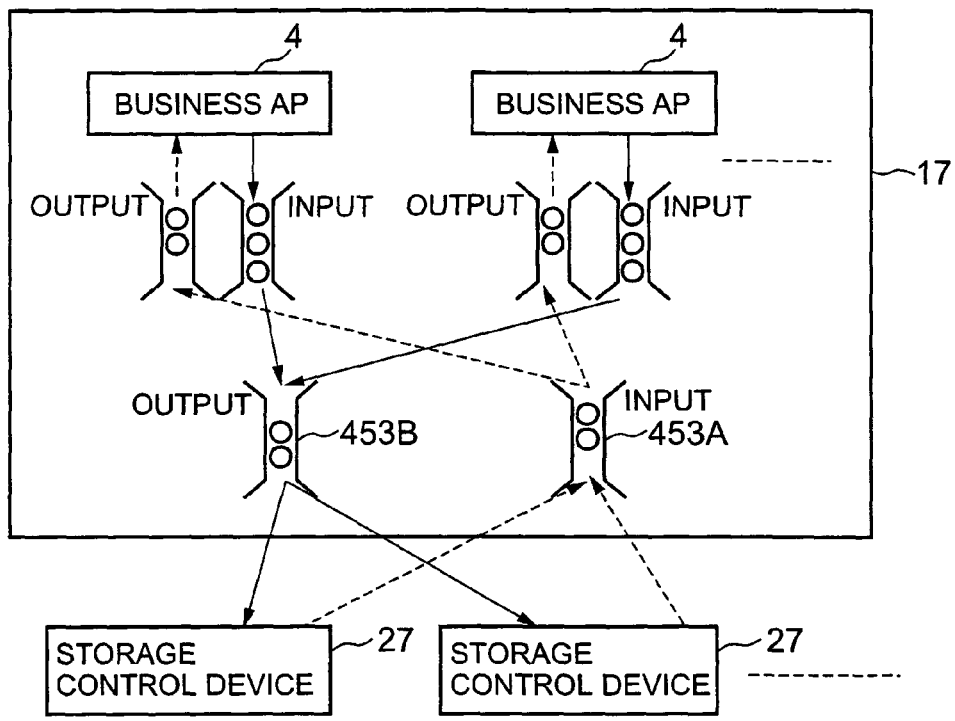
FIG. 21A shows an example of the connection between the business computer 17 and storage control device 27.
Figure 21B:
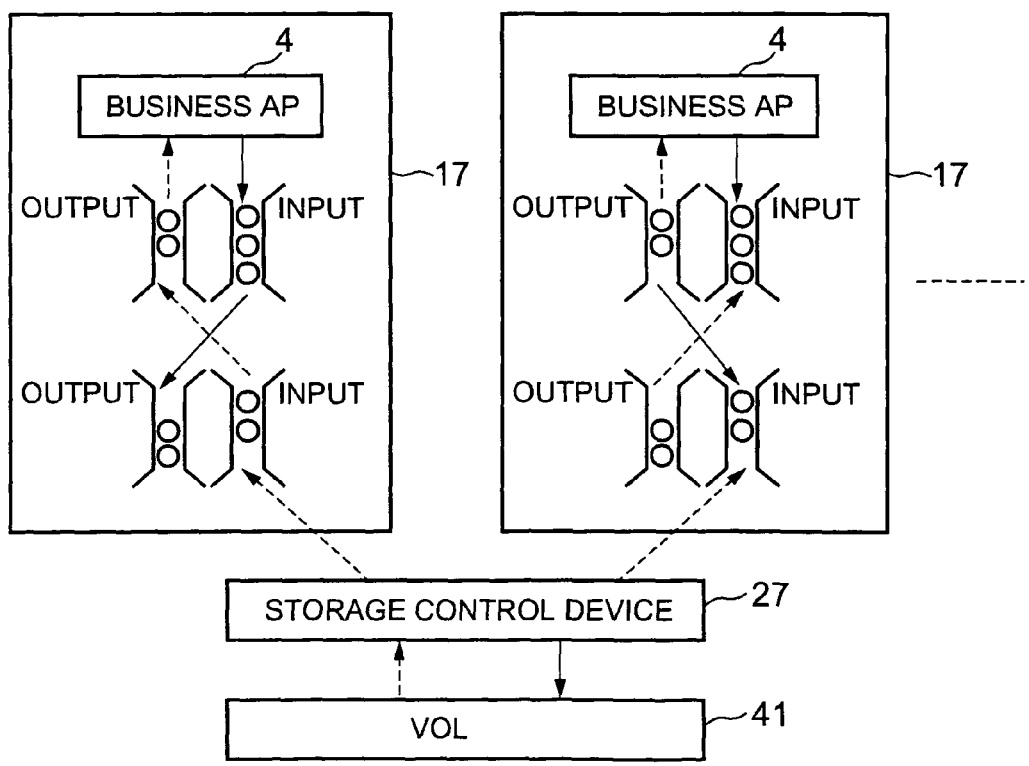
FIG. 21B shows another example of the connection between the business computer 17 and storage control device 27.

Further, for example, the connection between the business computer 17 and storage control device 27 is not limited to that described above. Hence, as shown in the example in FIG. 21A, a plurality of the business APs 4 may be provided in a single business computer 17, and a plurality of the storage control devices 27 may be connected communicably to this single business computer 17, for example. Furthermore, as shown in the example in FIG. 21B, a plurality of the business computers 17 may be connected communicably to a single storage control device 27, and a single business AP may be provided in each business computer 17.

Further, for example, a single storage area may be provided rather than differentiating between input buffers and output buffers. More specifically, for example, when the first input buffer and first output buffer are formed as a single storage area during outbound communication from the business computer 17, an element set comprising an information element output as a result of execution of the business AP may be stored in the single storage area, whereupon the element set may be output from the single storage area and transmitted to the storage control device 27 (in other words, the element set need not be moved from the first input buffer to the first output buffer). At this time, the performance requirement of each element set from among the plurality of element sets existing in the single storage area may be specified by the storage management processing portion 25. For example, the storage management processing portion 25 may specify the performance requirement from the business ID in each element set existing in the single storage area. Furthermore, in this case the weighting ratio may be set in relation to the performance requirement rather than the buffer.

Further, for example, information indicating the performance requirement corresponding to the business AP may be included in the business ID. In this case, the manager processing portion 7, storage management processing portion 25, and buffer control processing portion 409 can specify the performance requirement from the business ID.

Further, for example, another type of program may be employed in place of the business AP. For example, various programs (business programs, for example) that are capable of using the storages 39 may be employed.

The invention claimed is:

1. An information processing method carried out by a computer, in which one or a plurality of host devices for generating and transmitting information elements associated with business application programs are connected communicably to a storage control device for accessing storage by receiving and processing each information element, wherein said storage control device includes a cache area and at least two storage devices, said one or more host devices include at least one processor and a plurality of said business application programs executed by said at least one processor, said plurality of business application programs include a first business application program to which a high performance requirement is allocated and a second business application program to which a low performance requirement is allocated, said cache area includes a first cache sub-area corresponding to said high performance requirement and a second cache sub-area corresponding to said low performance requirement, said at least two storage devices includes a first storage device corresponding to said high performance requirement and a second storage device corresponding to said low performance requirement, where the first storage device provides a higher access speed than an access speed of the second storage device, said method comprising: using said first cache sub-area when processing an information element output as a result of execution of an information element request from said first business application program, and using said second cache sub-area when processing an information element output as a result of execution of an information element request from said second business application program, and using a management table to dynamically increase or decrease, by allocating or de-allocating a sub-area from a cache pool commonly provided to the plurality of the business application programs, a size of a storage capacity setting of said first cache sub-area or said second cache sub-area responsive to a processing of an information element output as a result of execution of said information element request from said first business application program or said second business application program, wherein a processing speed of the information element output as a result of execution of said information element request from said first business application program or said second business application program is dynamically raised by the increasing of the storage capacity setting of said first cache sub-area or said second cache sub-area, respectively, and wherein some information elements for said first business application program which is allocated with said high performance requirement are moved: from the first storage device to the first cache sub-area when the first cache sub-area is dynamically increased, and from the first cache sub-area to the first storage device when the first cache sub-area is dynamically decreased, and wherein some information elements for said second business application program which is allocated with said low performance requirement are moved: from the second storage device to the second cache sub-area when the second cache sub-area is dynamically increased, and from the second cache sub-area to the second storage device when the second cache sub-area is dynamically decreased.

2. The information processing method according to claim 1, wherein, when the information element output as a result of execution of said information element request from said first business application program is processed to access said storage, a certain location in said first cache sub-area is secured, and said information element is exchanged between said storage and said first business application program corresponding to said high performance requirement via said secured location.

3. The information processing method according to claim 1, said method comprising: using said management table to dynamically increase, by allocating said sub-area from said cache pool, a size of a storage capacity setting of said first cache sub-area responsive to a processing of an information element output as a result of execution of said information element request from said first business application program which is allocated with said high performance requirement, wherein a processing speed of the information element output as a result of execution of said information element request from said first business application program corresponding to said high performance requirement is dynamically raised by the increasing of the storage capacity setting of said first cache sub-area.

4. An information processing system comprising one or a plurality of host devices for generating and transmitting an information element resultant from any of a plurality of business application programs, and a storage control device which is capable of accessing storage by receiving and processing said information element, wherein said storage control device includes a cache area and at least two storage devices, said one or more host devices includes at least one processor and the plurality of business application programs executed by said at least one processor, said plurality of business application programs includes a first business application program to which a high performance requirement is allocated and a second business application program to which a low performance requirement is allocated, said cache area includes a first cache sub-area corresponding to said high performance requirement and a second cache sub-area corresponding to said low performance requirement, said at least two storage devices includes a first storage device corresponding to said high performance requirement and a second storage device corresponding to said low performance requirement, where the first storage device provides a higher access speed than an access speed of the second storage device, said storage control device uses said first cache sub-area when processing an information element output as a result of execution of an information element request from said first business application program, and uses said second cache sub-area when processing an information element output as a result of execution of an information element request from said second business application program, and said storage control device is adapted to use a management table to dynamically increase or decrease, by allocating or de-allocating a sub-area from a cache pool commonly provided to the plurality of the business application programs, a size of a storage capacity setting of said first cached sub-area or said second cache sub-area responsive to a processing of an information element output as a result of execution of said information element request from said first business application program or said second business application program, wherein said storage control device dynamically raises a processing speed of an information element output as a result of execution of said information element request from said first business application program or said second business application program by the increasing of the storage capacity setting of said first cache sub-area or said second cache sub-area, respectively, and wherein some information elements for said first business application program which is allocated with said high performance requirement are moved: from the first storage device to the first cache sub-area when the first cache sub-area is dynamically increased, and from the first cache sub-area to the first storage device when the first cache sub-area is dynamically decreased, and wherein some information elements for said second business application program which is allocated with said low performance requirement are moved: from the second storage device to the second cache sub-area when the second cache sub-area is dynamically increased, and from the second cache sub-area to the second storage device when the second cache sub-area is dynamically decreased.

5. The information processing system according to claim 4, wherein, said storage control device is adapted to secure, when the information element output as a result of execution of said information element request from said first business application program is processed to access said storage, a certain location in said first cache sub-area, and to exchange said information element between said storage and said first business application program corresponding to said high performance requirement via said secured location.

6. The information processing system according to claim 4, said storage control device is adapted to use said management table to dynamically increase, by allocating said sub-area from said cache pool, a size of a storage capacity setting of said first cache sub-area responsive to a processing of an information element output as a result of execution of said information element request from said first business application program which is allocated with said high performance requirement, wherein a processing speed of the information element output as a result of execution of said information element request from said first business application program corresponding to said high performance requirement is dynamically raised by the increasing of the storage capacity setting of said first cache sub-area.

* * * * *